United States Patent [19]

Tachiiwa et al.

[11] Patent Number: 5,080,818
[45] Date of Patent: Jan. 14, 1992

[54] ANTIFREEZE COMPOSITION

[75] Inventors: Hideya Tachiiwa; Tsuneyoshi Fujii; Yoshinori Ichiwara, all of Yokosuka, Japan

[73] Assignee: Nippon Shokubai Kagaku Kogyo Co., Ltd., Osaka, Japan

[21] Appl. No.: 497,529

[22] Filed: Mar. 22, 1990

Related U.S. Application Data

[63] Continuation of Ser. No. 207,251, Jun. 15, 1988, abandoned.

[30] Foreign Application Priority Data

| Jun. 16, 1987 | [JP] | Japan | 62-147969 |
| Jul. 31, 1987 | [JP] | Japan | 62-190194 |
| Oct. 30, 1987 | [JP] | Japan | 62-273272 |
| Nov. 2, 1987 | [JP] | Japan | 62-275851 |
| Nov. 19, 1987 | [JP] | Japan | 62-290574 |
| Apr. 11, 1988 | [JP] | Japan | 63-87219 |
| Apr. 12, 1988 | [JP] | Japan | 63-88281 |
| Apr. 13, 1988 | [JP] | Japan | 63-89145 |
| Apr. 15, 1988 | [JP] | Japan | 63-91594 |
| Jun. 2, 1988 | [JP] | Japan | 63-134316 |
| Jun. 3, 1988 | [JP] | Japan | 63-135626 |
| Jun. 6, 1988 | [JP] | Japan | 63-137465 |
| Jun. 7, 1988 | [JP] | Japan | 63-138557 |
| Jun. 9, 1988 | [JP] | Japan | 63-140521 |

[51] Int. Cl.$^5$ ................................ C09K 5/00
[52] U.S. Cl. ........................ 252/75; 252/74; 252/76; 252/77; 252/78.5; 252/79; 252/389.23; 252/389.53; 252/389.61
[58] Field of Search .......... 252/74, 75, 76, 389.2, 252/389.23, 389.53, 389.61, 77, 78.5, 79

[56] References Cited

U.S. PATENT DOCUMENTS

| 3,809,152 | 5/1974 | Boehmer | 252/75 |
| 4,338,209 | 7/1982 | Manabe et al. | 252/75 |
| 4,548,787 | 10/1985 | Wilson et al. | 252/75 |
| 4,584,119 | 4/1986 | Duranleau et al. | 252/76 |
| 4,587,028 | 5/1986 | Darden | 252/76 |
| 4,592,853 | 6/1986 | Darden et al. | 252/76 |
| 4,711,735 | 12/1987 | Gulley | 252/75 |

FOREIGN PATENT DOCUMENTS 1203161 8/1970 United Kingdom.

OTHER PUBLICATIONS

Chemical Abstracts, "The Protection of High-Efficiency Solar Thermal Collectors", vol. 94, No. 20, 159832k, 1980.

Primary Examiner—Paul Lieberman
Assistant Examiner—Christine A. Skane
Attorney, Agent, or Firm—Omri M. Behr

[57] ABSTRACT

An antifreeze composition comprising a glycol and water, containing (A) a phosphoric acid compound, (B) a compound of at least one metal selected from the group consisting of manganese and magnesium, (C) a corrosion-proofing agent, and optionally (D) at least one compound selected from the group consisting of (a) an aromatic polybasic acid or a salt thereof, (b) an aliphatic dicarboxylic acid or a salt thereof, (c) a molybdate, (d) a tungstate, (e) a homopolymer derived from an alkylene glycol monoallyl ether or a maleic type monomer, and (f) a copolymer thereof with another monomer and having a pH value in the range of 6.5 to 9.

14 Claims, No Drawings

ANTIFREEZE COMPOSITION

This application is a continuation of application Ser. No. 207,251, filed 6/15/88 abandoned.

BACKGROUND OF THE INVENTION

Field of the Invention

This invention relates to an antifreeze composition. Particularly, it relates to an antifreeze composition composed of a glycol, water, and a corrosion inhibiting agent and used for preventing the cooling water in the liquid-cooling type internal combustion engine from being frozen More particularly, it relates to an antifreeze composition which, as used in a cooling water for an automobile engine, manifests the effect thereof not merely in preventing the cooling water from being frozen but also in enabling the cooling system of the automobile engine to maintain the function of protecting the automobile engine against rusting and corrosion.

Description of the Prior Art

Heretofore, the cooling liquid for the liquid-cooling type internal combustion engine such as, for example, the automobile engine has heretofore used customarily, for the prevention of the phenomenon of freezing during the cold season, an antifreeze which uses an alcohol or a glycol as a main ingredient and additionally incorporates a varying corrosion-inhibiting agent to acquire an ability to prevent freezing and corrosion at the same time.

Examples of the alcohol generally used for this purpose include methyl alcohol, ethyl alcohol, and isopropyl alcohol and examples of the glycol generally adopted include ethylene glycol, propylene glycol, hexylene glycol, and glycerol. They are used either singly or in the form of a combination of two or more members. The antifreeze which uses as its main ingredient monoethylene glycol among other compounds cited above finds popular utility in the cooling liquid for the cooling system in the automobile engine.

In the case of an aqueous monoethylene glycol solution, the effect in preventing the freezing is obtained to $-15.5°$ C. with a concentration of 30% by volume and to $-37.0°$ C. with a concentration of 50% by volume.

Alcohols or glycols are oxidized on contact with air to produce acidic alcohols or oxides of glycols. The formation of such oxides of alcohols or glycols is all the more accelerated at an elevated temperature in the range of 50° to 100° C. These acidic alcohols or glycols promote corrosion of the cooling system in the internal combustion engine, particularly the various metal materials used in the automobile engine. The corrosion of the various metal materials of which the cooling system of the internal combustion engine is made is liable to degrade the thermal conductivity of the cooling system or clog the radiator tube with deposition of the product of corrosion and eventually cause an overheating of the engine.

The antifreeze which uses an alcohol or a glycol as a main ingredient thereof has to incoporate additionally therein a corrosion-inhibiting agent because the alcohol or glycol is devoid of an ability to prevent the corrosion.

The corrosion proofing agent for use in the antifreeze incorporates therein at least one member selected from the group consisting of borax, sodium nitrite, phosphoric acid, silicates, sodium benzoate, sodium salt of mercaptobenzothiazole, benzotriazole, methyl benzotriazole, triethanolamine, diethanolamine, monoethanolamine, triisopropanolamine, diisopropanolamine, monoisopropanolamine, cyclohexyl amine, ethylenediamine, hydrazine, pyridine, and morpholine (U.S. Pat. Nos. 3,046,229; 3,362,910; 3,282,846; 3,046,299; 4,149,985; and 4,333,843). As representatives of these compounds, there can be cited borax, phosphate of triethanolamine, sodium benzoate, sodium nitrite, and sodium silicate. Borax has found popular utility as an effective corrosion proofing agent for engines made of cast iron. In recent years, the general trend toward economization of resources and energies has urged the need of producing automobile parts with lighter materials and has consequently encouraged adoption of aluminum parts In the circumstances, the fact that borax is deficient in a capacity for corrosion proofing aluminum materials has constituted itself a serious problem.

It has been known that when an aqueous ethylene glycol solution incorporating borax therein is used in the cooling system of the automobile engine, this solution corrodes aluminum alloy as a material for a cylinder head and a cylinder block in the engine and the product of the corrosion clogs the radiator.

The phosphate of triethanolamine exhibits an outstanding capacity for corrosion proofing iron and aluminum materials and has found utility as a corrosion proofing agent to take the place of borax. A report has been published which purports that triethanolamine in the presence of a nitrite produces nitrosoamine. It is, therefore, desirable to avoid the occurrence of a nitrite where an amine is being used. The sodium benzoate, when used alone, cannot be expected to manifest a corrosion proofing effect favorably comparable with that of the agents mentioned above.

The sodium silicate is also effective in curbing the corrosion. It has a disadvantage, however, that it is liable to undergo separation by gelation during a protracted storage.

An object of this invention, therefore, is to provide a novel antifreeze composition.

Another object of this invention is to provide an antifreeze composition which manifests an outstanding effect in corrosion proofing metal materials.

SUMMARY OF THE INVENTION

The objects described above are accomplished by an antifreeze composition which comprises a glycol and water, contains (A) a phosphoric acid compound, (B) a compound of at least one metal selected from the group consisting of manganese and magnesium, and (C) a corrosion proofing agent, and has a pH value in the range of 6.5 to 9.

The objects mentioned above are also accomplished by an antifreeze composition which comprises a glycol and water, containing (A) a phosphoric acid compound, (B) a compound of at least one metal selected from the group consisting of manganese and magnesium, (C) a corrosion proofing agent, and (D) at least one compound selected from the group consisting of (a) an aromatic polybasic acid or a salt thereof, (b) an aliphatic dicarboxylic acid or a salt thereof, (c) a molybdate, (d) a tungstate, (e) a homopolymer derived from an alkylene glycol monoallyl ether (I) represented by the formula I:

$$CH_2=CH-CH_2O(C_2H_4O)_m(C_3H_6O)_nH \qquad (I)$$

wherein m and n are independently O or a positive integer, providing that the sum of m and n falls in the range of 1 to 100 and the ($C_2H_4O$) units and the ($C_3H_6O$) units may be bound in any order, or a maleic acid type monomer (II) represented by the formula II:

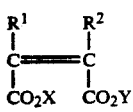

wherein $R^1$ and $R^2$ are independently hydrogen atom or methyl group, and X and Y are independently ($C_2H_4O$)$_p$($C_3H_6O$)$_q R^3$, wherein $R^3$ is alkyl group of 1 to 20 carbon atoms and p and q are independently O or a positive integer, providing that the sum of p and q falls in the range of 0 to 100 and the ($C_2H_4O$) units and the ($C_3H_6O$) units may be bound in any order, monovalent metal, divalent metal, ammonium group, or organic amine group, and (f) a copolymer derived from the alkylene glycol monoallyl ether (I) or the maleic acid type monomer (II) with a monomer (III) copolymerizable therewith, and has a pH value in the range of 6.5 to 9.

DESCRIPTION OF PREFERRED EMBODIMENTS

The glycols which are available for the present invention include ethylene glyocl, propylene glycol, butylene glycol, hexylene glycol, and glycerol. They may be used either singly or in the form of a combination of two or more members. The antifreeze which has as a main ingredient thereof monoethylene glycol among other compounds cited above is used as added to the cooling liquid in the cooling system for the automobile engine. The weight ratio of the glycol to water is in the range of 99 : 1 to 5 : 95, preferably 98 : 2 to 10 : 90. However, the antifreeze composition is commercially a concentrated state, e.g., the weight ratio of the glycol to water is 99 : 1 to 80 : 20, preferably 98 : 2 to 85 : 5 and is added into the cooling liquid (water) in a certain concentration depending on a freezing temperature.

The phosphoric acid compounds for use in the present invention are phosphoric acid and salts thereof. Primary through tertiary phosphorus salts of such alkali metals as lithium, sodium, and potassium or ammonia are available for this invention besides orthophosphoric acid. The amount of this compound to be added is in the range of 0.1 to 5% by weight, preferably 0.5 to 3% by weight, based on the amount of the antifreeze as produced.

Examples of the manganese compound used effectively in this invention include manganese oxide, manganese hydroxide, manganic acid, potassium permanganate, sodium permanganate, litium permanganate, magnesium permanganate, manganese chromate, manganese borate, manganese fluoride, manganese chloride, manganese bromide, manganese iodide, manganese carbonate, manganese nitrate, manganese sulfite, manganese sulfate, manganese ammonium sulfate, manganese phosphate, manganese hydrogen phosphate, manganese dihydrogen phosphate, manganese ammonium phosphate, manganese formate, manganese acetate, manganese oxalate, manganese butyrate, manganese lactate, manganese malonate, manganese tartrate, manganese succinate, manganese glycerate, manganese valerate, manganese maleate, manganese oleate, manganese citrate, iron manganese citrate, manganese benzoate, manganese salicylate, and manganese glutamate. The amount of the manganese compound to be added in this invention is in the range of 0.0001 to 0.05% by weight, preferably 0.005 to 0.02% by weight, based on the amount of the anitifreeze as produced.

Examples of the magnesium compound used effectively in this invention include magnesium oxide, magnesium hydroxide, magnesium permanganate, magnesium chronate magnesium fluoride, magnesium iodide, magnesium carbonte, magnesium borate, magnesium sulfate, magnesium titanate, magnesium tungstate, magnesium borate, magnesium phosphate, magnesium dihydrogen phosphate, magnesium ammonium phosphate, magnesium formate, magnesium actate, magnesium propionate magnesium butyrate, magnesium valerate, magnesium laurate, magnesium stearate, magnesium oleate, magnesium glutamate, magnesium lactate, magnesium succinate, magnesium malate, magnesium tartrate, magnesium hydrogen tartrate, magnesium maleate, magnesium citrate, magnesium oxalate, magnesium malonate, magnesium sebacate, magnesium benzoate, magnesium phthalate, magnesium salicylate, and magnesium mandelate. The amount of the magnesium compound to be added in the present invention is in the range of 0.001 to 0.08% by weight, preferably 0.005 to 0.05% by weight, based on the amount of the glycol.

The aromatic polybasic acids available for this invention are benzene-polycarboxyl group substitution products such as phthalic acid, isophthalic acid, terephthalic acid, hemimellitic acid, trimellitic acid, trimesic acid, pyromellitic acid. Monovalent metal salts, divalent metal salts, ammonium salts, organic amine salts, and other similar salts of such aromatic polybasic acids are also usable for this invention. The amount of the aromatic polybasic acid to be added in this invention is in the range of 0.05 to 1% by weight, preferably 0.1 to 0.5% by weight, based on the amount of the glycol.

The aliphatic dicarboxylic acids available for the present invention are oxalic acid, malinic acid, succinic acid, glutaric acid, adipic acid, piperic acid, suberic acid, azelaic acid, sebacic acid, brassylic acid, and thapsic acid. Monovalent metal salts, divalent metal salts, ammonium salts, organic amine salts, and other similar salts of these dicarboxylic acid are also usable in this invention. The amount of the dicarboxylic acid to be added herein is in the range of 0.05 to 1% by weight, preferably 0.1 to 0.7% by weight, based on the amount of the glycol.

The molybdates which are used effectively in the present invention include ammonium molybdate, ammonium phosphomolybdate, sodium molybdate, and potassium molybdate, for example. The amount of the molybdate to be added in the present invention is in the range of 0.1 to 1% by weight, preferably 0.3 to 0.7% by weight, based on the amount of the glycol.

The tungstates which are used effectively in the present invention include ammonium tungstate, sodium tungstate, and potassium tungstate, for example. The amount of the tungstate to be added in this invention is in the range of 0.1 to 1 % by weight, preferably 0.3 to 0.7% by weight, based on the amount of the glycol.

The polymers which are used effectively in the present invention include monopolymers (e) of polyalkylene glycol monoallyl ethers (I) and/or maleic acid type monomers (II) and copolymers (f) derived from the homopolymers (e) wtih monomers (III) copolymerizable therewith. Preferably, they are homopolymers of alkylene glycol monoallyl ethers (I) represented by the formula I:

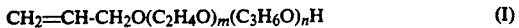

$$CH_2=CH\text{-}CH_2O(C_2H_4O)_m(C_3H_6O)_nH \qquad (I)$$

wherein m and n are independently 0 or a positive integer, providing that the sum of m and n falls in the range of 1 to 100, preferably 2 to 50, and the $(C_2H_4O)$ units and the $(C_3H_6O)$ units may be bound in any order, and/or a maleic acid type monomer (II) represented by the formula II:

$$\begin{array}{cc} R^1 & R^2 \\ | & | \\ C & C \\ | & | \\ CO_2X = CO_2Y \end{array} \qquad (II)$$

wherein $R^1$ and $R^2$ are independently hydrogen atom or methyl group, and X and Y are independently $(C_2H_4O)_p(C_3H_6O)_qR^3$, wherein $R^3$ is alkyl group of 1 to 20 carbon atoms, preferably 1 to 6 carbon atoms and p and q are independently 0 or a positive integer, providing that the sum of p and q falls in the range of 0 to 100, preferably 0 to 50, and the $(C_2H_4O)$ units and the $(C_3H_6O)$ units may be bound in any order, monovalent metal, divalent metal, ammonium group, or organic amine group, and copolymers derived from the homopolymers with monomers (III) copolymerizable therewith.

A polyalkylene glycol monoallyl ether (I) can be synthetized by the conventional method which comprises directly adding ethylene oxide and/or propylene oxide to allyl alcohol in the presence of an alkali such as KOH or NaOH as a catalyst The compounds represented by the general formulas mentioned above can be used singly or in the form of a combination of two or more members The maleic acid type monomers (II) are those represented by the formula II mentioned above Typical examples of the maleic acid type monomer include maleic acid, phthalic acid, citraconic acid, and mesaconic acid, monovalent metal salts, divalent metal salts, ammonium salts, and organic amine salts of the acids mentioned above, and esters of these acids with alcohols represented by the formula $HO(C_2H_4O)_p(C_3H_6O)_qR^3$, wherein $R^3$ is hydrogen atom or alkyl group of 1 to 20 carbon atoms, preferably 1 to 6 carbon atoms and p and q are independently 0 or a positive integer, providing that the sum of p and q falls in the range of 0 to 100, preferably 0 to 50, and the $(C_3H_6O)$ units and the $(C_2H_4O)$ units may be bound in any order. For example, secondary alcohol ethoxylate monomaleate can be used advantageously. The various maleic acid type monomers (II) cited above may be used singly or in the form of a combination of two or more members.

The monomers (III) which are copolymerizable with the polyalkylene glycol monoallyl ethers (I) and/or the maleic acid type monomers (II) mentioned above are acrylic acid, methacrylic acid, itaconic acid, and crotonic acid, monovalent metal salts, divalent metal salts, ammonium salts, and organic amine salts of the acids mentioned above, esters derived from these acids with alcohols, (meth)acrylamides, vinyl acetate, propenyl acetate, styrene, p-methylstyrene, and other aromatic vinyl compounds, and vinyl chloride, for example. These monomers may be used sin9ly or in the form of a combination of two or more members The copolymer is derived by using an alkylene glycol monoallyl ether (I), a maleic acid type monomer (II), and/or a monomer (III) copolymerizable therewith in respective proportions of 24 to 75 mol%, 24 to 75 mol%, and 0 to 50 mol%, providing that the total of the components (I), (II), and (III) is 100 mol%.

The polymer is produced by simply polymerizing the component monomers mentioned above with the aid of a polymerization initiator. The polymerization can be carried out in a solvent or by the technique of bulk polymerization.

The polymerization in a solvent can be performed either batchwise or continuously. Examples of the solvent which can be used in the polymerization include water, lower alcohols such as methyl alcohol, ethyl alchol, and isopropyl alcohol; aromatic or aliphatic hydrocarbons such as benzene, toluene, xylene, cyclohexane, and n-hexane; ethyl acetate; and ketones such a acetone and methylethyl ketone. From the standpoint of solubility of the monomer as raw material and of the polymer as product and conveniences of use of the copolymer, it is desirable to use at least one member selected from the group consisting of lower alcohols having one to four carbon atoms. In the lower alcohols of one to four carbon atoms, methyl alcohol, ethyl alcohol, and isopropyl alcohol are used particularly effectively.

Where the polymerization is carried out in water as a medium, a water-soluble polymerization initiator such as ammonium or alkali metal persulfate or hydrogen peroxide is used. In this case, a promoter such as sodium hydrogen sulfite may be additionally used in the polymerization. In the polymerization using a lower alochol, an aromatic hydrocarbon, an aliphatic hydrocarbon, ethyl acetate, or a ketone compound as a solvent, a peroxide such as benzoyl peroxide or lauroyl peroxide, a hydroperoxide such as cumene hydroperoxide, or an aliphatic azo compound such as azobisisobutyronitrile is used as a polymerization initiator. Amount of the polymerization initiator to be used is in the range of 0.1 to 10 % by weight, based on the monomers. In this case, a promoter such as an amine compound may be additionally used in the polymerization. Where a mixed solvent of water and a lower alcohol is used, a polymerization initiator or a combination of polymerization and promoter suitably selected from among the various compounds cited above may be used. Though the polymerization temperature is decided suitably depending on the kind of the solvent or that of the polymerization initiator to be used, it is generally in the range of 0° to 120° C., preferably 50 to 120° C.

The bulk polymerization is carried out at a temperature in the range of 50° to 150° C., preferably 80 to 120° C., in the presence of a polymerization initiator to be selected from among peroxides such as benzoyl peroxide and lauroyl proxide, hydroperoxides such a cumene hydroperoxide, and aliphatic azo compounds such as azobisisobutyronitrile.

Optionally, the copolymer to be obtained a described above may be neutralized with an alkaline substance before it is put to use. Examples of the alkaline substance usable advantageously for this purpose are hydroxides, chlorides, and carbonates of monovalent metals and divalent metals; ammonia; and organic amines.

Though the molecular weight which the copolymer is required to possess to be effectively used herein falls in a very wide range, it is generally in the range of 500 to 50,000, preferably 1,000 to 30,000.

The copolymer which is derived from a polyalkylene glycol monoallyl ether (I), a maleic acid type monomer (II), and a monomer (III) copolymerizable therewith and is contained in the antifreeze of the present invention manifests an outstanding effect in preventing deposition of scale in addition to an effect in curbing corrosion of iron materials. Thus, the antifreeze of the present invention solves the problem which is suffered by the automobile antifreeze containing a phosphate.

The amount of addition of the copolymer derived from the polyalkylene glycol monoallyl ether (I), the maleic acid type monomer (II), and the monomer (III) copolymerizable therewith is not less than 0.01% by weight, preferably in the range of 0.01 to 0.1% by weight, based on the amount of the glycol.

The corrosion proofing agent to be added to the antifreeze of the present invention is at least one member selected from the group consisting of sulfites, nitrates, silicates, vanadic acid, vanadates, sodium benzoate, sodium p-tertiary butylbenzoate, sodium mercaptobenzothiazole, methylbenzotriazole, and benzotriazole. As representatives of these corrosion proofing agents, nitrates, sodium mercaptobenzole, methyl benzotriazole, and sodium benzoate can be cited. The amount of the corrsionproofing agent to be added is in the range of 0.05 to 5% by weight, preferably 0.1 to 3% by weight, based on the amount of the glycol.

More specifically, the amount of sodium mercaptobenzothiazole to be added is in the range of 0.05 to 0.7% by weight, preferably 0.1 to 0.5% by weight, based on the amount of the glycol The nitrate is used in the form of an alkali metal salt such as sodium salt or potassium salt. The amount of the nitrate to be added is in the range of 0.05 to 0.7% by weight, preferably 0.1 to 0.5% by weight, based on the amount of the glycol The benzoate is used in the form of an alkali metal salt such as sodium salt or potassium salt. The amount of the benzoate to be added is in the range of 1.0 to 7.0% by weight, preferably 2.0 to 7.0% by weight, based on the amount of the antifreeze as produced. Further, methyl benzotriazole and benzotriazole are also available for this invention.

For the pH adjustment of the antifreeze, any of the basic substances heretofore accepted for the purpose can be used. Preferably, the hydroxide of an alkali metal such as lithium, sodium, or potassium can be used. The pH value of the antifreeze is adjusted in the range of 6.5 to 9, preferably 7 to 8. If the pH value is higher than this range, the antifreeze is deficient in the corrosionproofness to be manifested on aluminum. If the pH value is lower than this range, the antifreeze is capable of corroding iron materials. Thus, the pH value must fall in the range mentioned above to fulfil the effect thereof safely.

The antifreeze of the present invention permits incorporation therein of a defoaming agent such as silicone oil, mineral oil, alcohol, or higher fatty acid ester.

Now, the antifreeze of the present invention will be described more specifically below with reference to working examples and controls. It should be noted, however, that the present invention is not limited to the examples.

A : Method of Test for Metal Corrosion [Japanese Industrial Standard (JIS) K-2234 (Antifreeze) antifreeze concentration 15% by volume]

A test piece of varying metal such as cast aluminum, cast iron, steel, brass, solder, or copper was immersed in a sample antifreeze diluted to 15% by volume with prepared water (obtained by dissolving 148 mg of sodium sulfate, 165 mg of sodium chloride, and 138 mg of sodium hydrogen carbonate in 1 liter of distilled water) and left standing therein at a temperature of $88\pm2°$ C. for 336 hours, with dry air continuously supplied therein at a flow volume of $100\pm10$ ml/min. The mass of the test piece was determined before and after the test to find a change in the mass B : Method of Test for corrosion of Heat Transferring Surface Apparatus An apparatus capable of keeping the upper surface of a circular test piece in contact with a sample antifreeze, heating the lower surface of the test piece with a heater, and transferring heat through the test piece to the sample antifreeze was used.

Procedure (1) The test piece was polished with a water-resisting abrasive paper, #320, until it acquired flat smooth surface (2) A test solution was prepared by diluting a given antifreeze with distilled water or purified water to 20% by volume. To this solution, sodium cloride was added in such an amount that it acquired a chlorine ion concentration of 100 ppm.

(3) The sample was placed in the apparatus and then compressed with air to 0.5 $Kg/cm^2$ G.

(4) After the test, the test piece was cleaned of adhering precipitate, dried, and weighed accurately.

Test Conditions

Test piece: Cast aluminum (AC2A)
Temperature of test piece: $135\pm1°$ C.
Concentration of antifreeze: Aqueous solution of 20% by volume
Amount of antifreeze: 500 ml
Testing time: 168 hours (continuous)

Test items (1) Appearance of test piece
(2) Change in mass of test piece
The change of mass was calculated by the following formula:

$$C = (m_2 - m_1)/X$$

wherein C stands for change in mass (mg/cm$^3$), $M_1$ for mass (mg) of the test piece before the test, $m_2$ for mass (mg) of the test piece after the test, and S for the total surface area (cm$^2$) of the test piece before the test.

(3) Liquid phase after the test
(4) pH

C : Method of Determination of Amount of precipitate

In a glass beaker, 400 ml of a sample of varying composition indicated in Table 1 was placed and 400 ml of tap water containing 9 ppm of calcium and 5 ppm of magnesium was added thereto. The beaker was kept at 80° C. in an oil bath and left standing therein at rest for 24 hours. The scale formed in the beaker was separated by centrifugation (1500 r.p.m.) to find the amount of precipitate (ml/800 ml). The results were as shown in Table 1.

EXAMPLES 1 to 6

Varying components indicated in Table 1 were dissolved in proportions indicated in Table 1 in 5 parts by weight of tap water or 95 parts by weight of monoethylene glycol and the two liquids were mixed. Each of the samples thus prepared was subjected to the following tests and relevant measurements.

A : Test for metal corrosion

B : Test for corrosion of transferring surface
The results were as shown in Table 1.

CONTROLS 1 to 5

Samples were prepared by following the procedure of Examples 1 to 6, except that varying components indicated in Table 1 were used instead They were subjected to the test similarly. The results were as shown in Table 1.

TABLE 1

| Item | Example 1 | Example 2 | Example 3 | Example 4 | Example 5 | Example 6 |
|---|---|---|---|---|---|---|
| Composition of antifreeze (% by weight) | | | | | | |
| Monoethylene glycol | 95 | 95 | 95 | 95 | 95 | 95 |
| Water | 5 | 5 | 5 | 5 | 5 | 5 |
| Phosphoric acid (85% by weight) | 1.5 | | 1.5 | 1.5 | 1.5 | 1.5 |
| Potassium Phosphate II | | 2.0 | | | | |
| Phthalic acid | 0.3 | 0.3 | | 0.3 | 0.3 | 0.3 |
| Isophthalic acid | | | 0.3 | | | |
| Magnesium nitrate | 0.02 | 0.02 | 0.02 | 0.005 | 0.05 | 0.02 |
| Mercaptobenzothiazole | 0.3 | 0.3 | 0.3 | 0.3 | 0.3 | 0.3 |
| Methyl benzotriazole | 0.2 | 0.2 | 0.2 | 0.2 | 0.2 | 0.2 |
| Benzotriazole | 0.1 | 0.1 | 0.1 | 0.1 | 0.1 | 0.1 |
| Sodium nitrate | 0.4 | 0.4 | 0.4 | 0.4 | 0.4 | 0.4 |
| Sodium benzoate | 3.0 | 3.0 | 3.0 | 3.0 | 3.0 | 3.0 |
| Sodium molybdate | 0.5 | 0.5 | 0.5 | 0.5 | 0.5 | 0.5 |
| Potassium hydroxide | 1.8 | 0.8 | 1.8 | 1.8 | 1.8 | |
| Sodium hydroxide | | | | | | 1.0 |
| Test for metal corrosion (mg/cm$^2$) | | | | | | |
| Cast aluminum | −0.02 | −0.07 | −0.01 | −0.13 | −0.02 | −0.03 |
| Cast iron | −0.03 | −0.03 | −0.01 | −0.12 | −0.02 | −0.01 |
| Steel | −0.02 | −0.01 | −0.04 | −0.10 | −0.03 | −0.02 |
| Brass | −0.06 | −0.04 | −0.05 | −0.08 | −0.04 | −0.04 |
| Solder | −0.07 | −0.05 | −0.06 | −0.10 | −0.03 | −0.05 |
| Copper | −0.04 | −0.03 | −0.06 | −0.09 | −0.05 | −0.02 |
| Appearance | no corrosion | no corrosion | no corrosion | no corrosion | no corrosion | no corrosion |
| Test for corrosion of transferring surface | | | | | | |
| change in mass of test piece (mg/cm$^2$) | −0.03 | −0.05 | −0.20 | −0.47 | −0.00 | −0.05 |
| pH before test | 7.6 | 7.6 | 7.6 | 7.6 | 7.6 | 7.6 |
| pH after test | 7.5 | 7.5 | 7.7 | 7.7 | 7.6 | 7.6 |
| Appearance of solution after test | not changed | not changed | not changed | not changed | not changed | not changed |
| Appearance of test piece after test | not changed | not changed | not changed | not changed | not changed | not changed |

| Item | Control 1 | Control 2 | Control 3 | Control 4 | Control 5 |
|---|---|---|---|---|---|
| Composition of antifreeze (% by weight) | | | | | |
| Monoethylene glycol | 95 | 95 | 95 | 95 | 95 |
| Water | 5 | 5 | 5 | 5 | 5 |
| Phosphoric acid (85% by weight) | | 1.5 | 1.5 | 1.5 | 1.5 |
| Potassium Phosphate II | | | | | |
| Phthalic acid | 0.3 | | 0.3 | 0.3 | 0.3 |
| Isophthalic acid | | | | | |
| Magnesium nitrate | 0.02 | 0.02 | | 0.02 | 0.02 |
| Mercaptobenzothiazole | 0.3 | 0.3 | 0.3 | | 0.3 |
| Methyl benzotriazole | 0.2 | 0.2 | 0.2 | | 0.2 |
| Benzotriazole | 0.1 | 0.1 | 0.1 | | 0.1 |
| Sodium nitrate | 0.4 | 0.4 | 0.4 | | 0.4 |
| Sodium benzoate | 3.0 | 3.0 | 3.0 | | 3.0 |
| Sodium molybdate | 0.5 | 0.5 | 0.5 | | 0.5 |
| Potassium hydroxide | 0.8 | 1.0 | 1.8 | 1.8 | |
| Sodium hydroxide | | | | | |
| Test for metal corrosion (mg/cm$^2$) | | | | | |
| Cast aluminum | −2.23 | −0.23 | −1.02 | −2.81 | −0.20 |
| Cast iron | −0.35 | −0.08 | −0.64 | −1.55 | −0.58 |
| Steel | −0.25 | −0.05 | −0.13 | −0.42 | −0.26 |
| Brass | −0.09 | −0.06 | −0.11 | −0.47 | −0.12 |
| Solder | −0.21 | −0.08 | −0.15 | −0.86 | −0.10 |
| Copper | −0.14 | −0.05 | −0.06 | −0.56 | −0.14 |
| Appearance | Note 1 | no corrosion | Note 1 | Note 2 | Note 3 |
| Test for corrosion of transferring surface | | | | | |
| change in mass of test piece (mg/cm$^2$) | −3.15 | −2.36 | −3.77 | −2.20 | −1.13 |
| pH before test | 7.6 | 8.0 | 7.6 | 7.6 | 6.2 |
| pH after test | 9.5 | 9.0 | 8.2 | 9.3 | 7.5 |
| Appearance of solution after test | cl | cl | cl | cl | not changed |

TABLE 1-continued

| Appearance of test piece after test | bk | bk | bk | bk | bk |

Note 1: cast aluminum and cast iron corrosion
Note 2: cast aluminum, cast iron and solder corrosion
Note 3: cast iron corrosion
cl: cloudy
bk: black

REFERENTIAL EXAMPLE 1

Preparation of copolymer (1))

In a glass reaction vessel provided with a thermometer, a stirrer, a dropping funnel, a gas inlet tube, and a reflux condenser, 334 parts of polyethylene glycol monoallyl ether (containing an average of five ethylene oxide units per molecule) and 100 parts of water were placed and kept stirred and, after displacement of the inner gas of the reaction vessel with nitrogen, heated to 95° C. in an atmosphere of nitrogen. Then, an aqueous solution obtained by dissolving 139.3 parts of maleic acid and 14.2 parts of ammonium persulfate in 225 parts of water was added to the solution in the reaction vessel over a period of 120 minutes. After completion of this addition, 14.2 parts of an aqueous 20% ammonium persulfate solution was added thereto over a period of 20 minutes After completion of the addition, the inner temperature of the reaction vessel was maintained at 95° C. for 100 minutes to complete the polymerization reaction and obtain an aqueous solution of copolymer. This aqueous copolymer solution was neutralized by addition of an aqueous 40% caustic soda solution. Thus, an aqueous solution of a sodium salt of copolymer (1) (hereinafter referred to as "copolymer (1) sodium salt" for short).

This aqueous solution of sodium salt of copolymer (1) had a pH value of 9.5 and a viscosity of 203 cp.

REFERENTIAL EXAMPLE 2

Preparation of copolymer (2))

In a glass reaction vessel provided with a thermometer, a stirrer, a dropping funnel, a gas inlet tube, and a reflux condenser, 317.3 parts of polyethylene glycol monoallyl ether (containing an average of five ethylene oxide units per molecule) and 88.5 parts of water were placed, kept stirred and, after displacement of the inner gas of the reaction vessel with nitrogen gas, heated to 95° C. in an atmosphere of nitrogen. Then, an aqueous solution of 139.3 parts of maleic acid and 11.1 parts of ammonium persulfate in 209 parts of water was added thereto in combination with 2 parts of styrene over a period of 120 minutes After completion of this addition, 27.8 parts of an aqueous 20% ammonium persulfate solution was added thereto over a period of 60 minutes. After completion of the addition, the inner temperature of the reaction vessel was kept at 95° C. for 90 minutes to complete the polymerization and obtain a copolymer (2).

The copolymer (2) was neutralized by addition of an aqueous 40% caustic soda solution, to obtain an aqueous solution of copolymer (2). This aqueous solution had a pH value of 9.5 and a viscosity of 198 cp.

REFERENTIAL EXAMPLE 3

(Preparation of copolymer (3))

In a glass reaction vessel provided with a thermometer, a stirrer, a dropping funnel, a gas inlet tube, and a reflux condenser, 399.6 parts of polyalkylene glycol monoallyl ether (containing 10 ethylene oxide units and two proylene oxide units on the average per molecule) and 203.5 parts of water were placed and kept stirred and, after displacement of the inner gas of the reaction vessel with nitrogen, heated to 95° C. in an atmosphere of nitrogen gas. Then, an aqueous solution of 75.4 parts of maleic acid and 17.1 parts of ammonium persulfate in 113.2 parts of water was added thereto over a period of 120 minutes. After completion of this addition, 17.1 parts of an aqueous 20% ammonium persulfte solution was added thereto over a period of 20 minutes. After completion of the addition, the inner temperature of the reaction vessel was maintained at 95° C. for 100 minutes to complete the polymerization and produce an aqueous solution of copolymer. Then, this aqueous solution of copolymer was neutralized by addition of an aqueous 40% caustic soda to obtain an aqueous solution of copolymer (3). This solution had a pH value of 9.5 and a viscosity of 135 pc.

EXAMPLES 7 to 14

Varying components indicated in Table 2 were dissolved in varying proportions indicated in Table 2 in 5 parts by weight of tap water or 95 parts by weight of monoethylene glycol and the two liquids were mixed.

The varying samples were subjected to the following test and relevant measurements.

A : Test for metal corrosion
B : Test for corrosion of transferring surface
C : Determination of amount of precipitate

CONTROLS 6 to 12

Samples were prepared by following the procedure of Examples 7 to 14, except that varying components indicated in Table 2 were used in varying proportions correspondingly shown in the same table instead. The samples thus obtained were similarly tested. The results were as shown in Table 2.

TABLE 2

| | Example | | | | | | | |
|---|---|---|---|---|---|---|---|---|
| Item | 7 | 8 | 9 | 10 | 11 | 12 | 13 | 14 |
| Composition of antifreeze (% by weight) | | | | | | | | |
| Monoethylene glycol | 95 | 95 | 95 | 95 | 95 | 95 | 95 | 95 |
| Water | 5 | 5 | 5 | 5 | 5 | 5 | 5 | 5 |
| Phosphoric acid (85% by weight) | 1.5 | | 1.5 | 1.5 | 1.5 | 1.5 | 1.5 | 1.5 |
| Potassium Phosphate II | | 2.0 | | | | | | |
| Phthalic acid | 0.3 | 0.3 | | 0.3 | 0.3 | 0.3 | 0.3 | 0.3 |
| Isophthalic acid | | | 0.3 | | | | | |

TABLE 2-continued

| Item | | | | | | | | |
|---|---|---|---|---|---|---|---|---|
| Magnese nitrate | 0.007 | 0.007 | 0.007 | 0.007 | 0.007 | 0.0005 | 0.030 | 0.007 |
| Sodium molybdate | 0.5 | 0.5 | 0.5 | 0.5 | 0.5 | 0.5 | 0.5 | 0.5 |
| Sodium mercaptobenzothiazole | 0.3 | 0.3 | 0.3 | 0.3 | 0.3 | 0.3 | 0.3 | 0.3 |
| Methyl benzotriazole | 0.2 | 0.2 | 0.2 | 0.2 | 0.2 | 0.2 | 0.2 | 0.2 |
| Benzotriazole | 0.1 | 0.1 | 0.1 | 0.1 | 0.1 | 0.1 | 0.1 | 0.1 |
| Sodium nitrate | 0.4 | 0.4 | 0.4 | 0.4 | 0.4 | 0.4 | 0.4 | 0.4 |
| Sodium benzoate | 3.0 | 3.0 | 3.0 | 3.0 | 3.0 | 3.0 | 3.0 | 3.0 |
| Copolymer (1) | 0.05 | 0.05 | 0.05 | | | 0.05 | 0.05 | 0.05 |
| Copolymer (2) | | | | 0.05 | | | | |
| Copolymer (3) | | | | | 0.05 | | | |
| Potassium hydroxide | 1.8 | 0.8 | 1.8 | 1.8 | 1.8 | 1.8 | 1.8 | 0.8 |
| Sodium hydroxide | | | | | | | | |
| Test for metal corrosion (mg/cm$^2$) | | | | | | | | |
| Cast aluminum | 0.00 | 0.00 | −0.01 | −0.04 | −0.06 | −0.03 | +0.00 | +0.02 |
| Cast iron | −0.01 | −0.01 | −0.03 | −0.04 | −0.04 | −0.02 | −0.04 | −0.03 |
| Steel | −0.01 | −0.02 | −0.02 | −0.03 | −0.02 | −0.04 | −0.05 | −0.00 |
| Brass | −0.02 | −0.02 | −0.01 | −0.04 | −0.04 | −0.01 | −0.01 | −0.01 |
| Solder | −0.03 | −0.01 | −0.04 | −0.03 | −0.04 | −0.01 | −0.06 | −0.05 |
| Copper | −0.01 | −0.01 | −0.01 | −0.02 | −0.02 | −0.04 | −0.03 | −0.01 |
| Appearance | no corrosion | no corrosion | no corrosion | no corrosion | no corrosion | no corrosion | no corrosion | no corrosion |
| Amount of precipitate (ml/800 ml) | trace | trace | trace | trace | trace | trace | trace | trace |
| Test for corrosion of transferring surface | | | | | | | | |
| change in mass of test piece (mg/cm$^2$) | −0.02 | −0.04 | −0.10 | −0.12 | −0.12 | −0.20 | −0.18 | −0.07 |
| pH before test | 7.7 | 7.7 | 7.7 | 7.6 | 7.7 | 7.7 | 7.7 | 7.7 |
| pH after test | 7.7 | 7.7 | 7.7 | 7.5 | 7.5 | 7.7 | 7.7 | 7.7 |
| Appearance of solution after test | not changed | not changed | not changed | not changed | not changed | not changed | not changed | not changed |
| Appearance of test piece after test | not changed | not changed | not changed | not changed | not changed | not changed | not changed | not changed |

| | Control | | | | | | |
|---|---|---|---|---|---|---|---|
| Item | 6 | 7 | 8 | 9 | 10 | 11 | 12 |
| Composition of antifreeze (% by weight) | | | | | | | |
| Monoethylene glycol | 95 | 95 | 95 | 95 | 95 | 95 | 95 |
| Water | 5 | 5 | 5 | 5 | 5 | 5 | 5 |
| Phosphoric acid (85% by weight) | | 1.5 | 1.5 | 1.5 | 1.5 | 1.5 | 1.5 |
| Potassium Phosphate II | | | | | | | |
| Phthalic acid | 0.3 | | 0.3 | 0.3 | 0.3 | 0.3 | 0.3 |
| Isophthalic acid | | | | | | | |
| Magnese nitrate | 0.007 | 0.007 | | 0.007 | 0.007 | 0.007 | 0.007 |
| Sodium molybdate | 0.5 | 0.5 | 0.5 | | 0.5 | 0.5 | 0.5 |
| Sodium mercaptobenzothiazole | 0.3 | 0.3 | 0.3 | 0.3 | | 0.3 | 0.3 |
| Methyl benzotriazole | 0.2 | 0.2 | 0.2 | 0.2 | | 0.2 | 0.2 |
| Benzotriazole | 0.1 | 0.1 | 0.1 | 0.1 | | 0.1 | 0.1 |
| Sodium nitrate | 0.4 | 0.4 | 0.4 | 0.4 | | 0.4 | 0.4 |
| Sodium benzoate | 3.0 | 3.0 | 3.0 | 3.0 | | 3.0 | 3.0 |
| Copolymer (1) | 0.05 | 0.05 | 0.05 | 0.05 | 0.05 | | 0.05 |
| Copolymer (2) | | | | | | | |
| Copolymer (3) | | | | | | | |
| Potassium hydroxide | 0.8 | 1.0 | 1.8 | 1.8 | 1.8 | 1.8 | |
| Sodium hydroxide | | | | | | | |
| Test for metal corrosion (mg/cm$^2$) | | | | | | | |
| Cast aluminum | −1.86 | −0.32 | −1.20 | −2.56 | −3.20 | −0.03 | −0.22 |
| Cast iron | −0.34 | −0.10 | −0.73 | −0.65 | −1.40 | −0.26 | −0.36 |
| Steel | −0.06 | −0.03 | −0.14 | −0.22 | −0.18 | −0.14 | −0.20 |
| Brass | −0.10 | −0.02 | −0.10 | −0.16 | −0.22 | −0.06 | −0.08 |
| Solder | −0.64 | −0.08 | −0.18 | −0.22 | −1.28 | −0.02 | −0.01 |
| Copper | −0.08 | −0.04 | −0.04 | −0.18 | −0.14 | −0.06 | −0.07 |
| Appearance | Note 4 | Note 5 | Note 1 | Note 1 | Note 4 | Note 6 | Note 1 |
| Amount of precipitate (ml/800 ml) | 0.08 | trace | 0.05 | trace | 0.05 | 0.50 | trace |
| Test for corrosion of transferring surface | | | | | | | |
| change in mass of test piece (mg/cm$^2$) | −2.45 | −1.40 | −4.06 | −2.66 | −1.45 | −0.14 | −0.58 |
| pH before test | 7.7 | 8.2 | 7.8 | 7.6 | 7.7 | 7.7 | 6.2 |
| pH after test | 9.6 | 9.0 | 8.6 | 9.2 | 9.4 | 7.8 | 7.3 |
| Appearance of solution after test | cl | cl | cl | cl | cl | not changed | not changed |
| Appearance of test piece after test | bk | bw | bk | bk | bk | not changed | bw |

Note 1: cast aluminum and cast iron corrosion
Note 4: squeeze corrosion of cast aluminum and cast iron
Note 5: squeeze corrosion of cast aluminum
Note 6: squeeze corrosion of cast iron
bw: blown
cl: cloudy
bk: black

EXAMPLES 15 to 19

Varying components indicated in Table 3 were dissolved in varying proportions indicated in Table 3 in 5 parts by weight of tap water of 95 parts by weight of monoethylene glycol and the two liquids were mixed.

The varying samples thus obtained were subjected to the following test and relevant measurement.

Test for metal corrosion

The results were as shown in Table 3.

CONTROLS 13 to 16

Varying components indicated in Table 3 were dissolved in varying proportions indicated in Table 3 in 5 parts by weight of tap water or 95 parts by weight of monoethylene glycol and the two liquids were mixed.

The varying samples thus obtained were subjected to the following test and relevant measurement.

Test for metal corrosion

The results were as shown in Table 3.

parts by weight of tap water or 95 parts by weight of monoethylene glycol and the two liquids were mixed.

The varying samples thus obtained were subjected to the following test and relevant measurement.

Test for metal corrosion

The results were as shown in Table 4.

CONTROLS 17 to 21

Varying components indicated in Table 4 were dissolved in varying proportions indicated in Table 4 in 5 parts by weight of tap water or 95 parts by weight of monoethylene glycol and the two liquids were mixed.

The varying samples thus obtained were subjected to

TABLE 3

| | Example | | | | | Control | | | |
|---|---|---|---|---|---|---|---|---|---|
| | 15 | 16 | 17 | 18 | 19 | 13 | 14 | 15 | 16 |
| Composition of antifreeze (% by weight) | | | | | | | | | |
| Monoethylene glycol | 95 | 95 | 95 | 95 | 95 | 95 | 95 | 95 | 95 |
| Water | 5 | 5 | 5 | 5 | 5 | 5 | 5 | 5 | 5 |
| Phosphoric acid (85% by weight) | 1.5 | | 1.5 | 1.5 | 1.5 | 1.5 | 1.5 | 1.5 | 1.5 |
| Potassium phosphate II | | 2.0 | | | | | | | |
| Manganese nitrate | 0.007 | 0.007 | 0.0005 | 0.030 | 0.007 | | 0.007 | 0.007 | 0.007 |
| Mercaptobenzothiazole soda | 0.4 | 0.4 | 0.4 | 0.4 | 0.4 | 0.4 | | 0.4 | 0.4 |
| Sodium nitrate | 0.4 | 0.4 | 0.4 | 0.4 | 0.4 | 0.4 | 0.4 | | 0.4 |
| Sodium benzoate | 5.0 | 5.0 | 5.0 | 5.0 | 5.0 | 5.0 | 5.0 | 5.0 | |
| Potassium hydroxide | 1.0 | 0.4 | 1.0 | 1.0 | | 1.0 | 1.0 | 1.0 | 1.0 |
| Sodium hydroxide | | | | | 0.5 | | | | |
| Test for metal corrosion (mg/cm$^2$) | | | | | | | | | |
| Cast aluminum | −0.00 | 0 | −0.01 | −0.01 | 0 | −0.68 | −0.36 | −0.19 | −0.18 |
| Cast iron | −0.01 | −0.02 | −0.01 | −0.03 | −0.02 | −0.45 | −0.18 | −0.29 | −0.38 |
| Steel | −0.02 | −0.04 | −0.01 | 0 | −0.03 | −0.33 | −0.26 | −0.18 | −0.18 |
| Brass | −0.03 | −0.01 | −0.03 | −0.02 | 0 | −0.04 | −0.31 | −0.06 | −0.07 |
| Solder | −0.04 | −0.03 | −0.01 | −0.02 | −0.03 | −0.16 | −0.26 | −0.10 | −0.24 |
| Copper | −0.02 | 0 | −0.01 | −0.03 | −0.01 | −0.02 | −0.30 | −0.08 | 0.08 |
| Appearance of test piece | no corrosion | no corrosion | no corrosion | no corrosion | no corrosion | corrosion | corrosion | corrosion | corrosion |

EXAMPLES 20 to 25

Varying components indicated in Table 4 were dissolved in varying proportions indicated in Table 4 in 5 the following test and relevant measurement.

Test for metal corrosion

The results were as shown in Table 4.

TABLE 4

| | Example | | | | | |
|---|---|---|---|---|---|---|
| | 20 | 21 | 22 | 23 | 24 | 25 |
| Composition of antifreeze (% by weight) | | | | | | |
| Monoethylene glycol | 95 | 95 | 95 | 95 | 95 | 95 |
| Water | 5 | 5 | 5 | 5 | 5 | 5 |
| Phosphoric acid (85% by weight) | 1.5 | | 1.5 | 1.5 | 1.5 | 1.5 |
| Potassium phosphate II | | 2.0 | | | | |
| Maganese nitrate | 0.007 | 0.007 | 0.0005 | 0.030 | 0.007 | 0.007 |
| Mercaptobenzothiazole soda | 0.4 | 0.4 | 0.4 | 0.4 | 0.4 | 0.4 |
| Sodium nitrate | 0.4 | 0.4 | 0.4 | 0.4 | 0.4 | 0.4 |
| Sodium benzoate | 5.0 | 5.0 | 5.0 | 5.0 | 5.0 | 5.0 |
| Phthalic acid | 0.3 | 0.3 | 0.3 | 0.3 | | 0.3 |
| Isophtalic acid | | | | | 0.3 | |
| Potassium hydroxide | 1.8 | 0.8 | 1.8 | 1.8 | 1.8 | |
| Sodium hydroxide | | | | | | 0.8 |
| Test for metal corrosion (mg/cm$^2$) | | | | | | |
| Cast aluminum | −0.01 | −0.06 | −0.04 | −0.00 | −0.02 | −0.06 |
| Cast iron | −0.02 | −0.03 | −0.01 | −0.01 | −0.06 | −0.05 |
| Steel | −0.03 | −0.01 | −0.04 | −0.04 | −0.01 | −0.00 |
| Brass | −0.00 | −0.03 | −0.02 | −0.06 | −0.01 | −0.02 |
| Solder | −0.06 | −0.09 | −0.07 | −0.06 | −0.08 | −0.04 |
| Copper | −0.04 | −0.05 | −0.03 | −0.04 | −0.02 | −0.04 |
| Appearance of test piece | no corrosion | no corrosion | no corrosion | no corrosion | no corrosion | no corrosion |

| | Control | | | | |
|---|---|---|---|---|---|
| | 17 | 18 | 19 | 20 | 21 |
| Composition of antifreeze (% by weight) | | | | | |
| Monoethylene glycol | 95 | 95 | 95 | 95 | 95 |

TABLE 4-continued

| | | | | | |
|---|---|---|---|---|---|
| Water | 5 | 5 | 5 | 5 | 5 |
| Phosphoric acid (85% by weight) | 1.5 | 1.5 | 1.5 | 1.5 | 1.5 |
| Potassium phosphate II | | | | | |
| Maganese nitrate | | 0.007 | 0.007 | 0.007 | 0.007 |
| Mercaptobenzothiazole soda | 0.4 | | 0.4 | 0.4 | 0.4 |
| Sodium nitrate | 0.4 | 0.4 | | 0.4 | 0.4 |
| Sodium benzoate | 5.0 | 5.0 | 5.0 | | 5.0 |
| Phthalic acid | 0.3 | 0.3 | 0.3 | 0.3 | |
| Isophtalic acid | | | | | |
| Potassium hydroxide | 1.8 | 1.8 | 1.8 | 1.8 | 1.0 |
| Sodium hydroxide | | | | | |
| Test for metal corrosion (mg/cm$^2$) | | | | | |
| Cast aluminum | −1.32 | −0.49 | −0.96 | −0.55 | 0.64 |
| Cast iron | −0.59 | −0.41 | −0.46 | −1.59 | −0.22 |
| Steel | −0.02 | −0.29 | −0.23 | −0.08 | −0.06 |
| Brass | −0.06 | −0.19 | 0.01 | −0.05 | −0.11 |
| Solder | −0.23 | −0.30 | −0.18 | −0.67 | −0.23 |
| Copper | −0.08 | −0.08 | −0.17 | −0.14 | −0.09 |
| Appearance of test piece | corrosion | corrosion | corrosion | corrosion | corrosion |

EXAMPLES 26 to 31

Varying components indicated in Table 5 were dissolved in varying proportions indicated in Table 5 in 5 parts by weight of tap water or 95 parts by weight of monoethylene glycol and the two liquid were mixed.

The varying samples thus obtained were subjected to the following test and relevant measurement.

Test for metal corrosion

The results were as shown in Table 5.

CONTROLS 22 to 26

Varying components indicated in Table 5 were dissolved in varying proportions indicated in Table 5 in 5 parts by weight of tap water or 95 parts by weight of monoethylene glycol and the two liquids were mixed.

The varying samples thus obtained were subjected to following test and relevant measurement.

Test for metal corrosion

The results were as shown in Table 5.

TABLE 5

| | Example | | | | | |
|---|---|---|---|---|---|---|
| | 26 | 27 | 28 | 29 | 30 | 31 |
| Composition of antifreeze (% by weight) | | | | | | |
| Monoethylene glycol | 95 | 95 | 95 | 95 | 95 | 95 |
| Water | 5 | 5 | 5 | 5 | 5 | 5 |
| Phosphoric acid (85% by weight) | 1.5 | | 1.5 | 1.5 | 1.5 | 1.5 |
| Potassium phosphate II | | 2.0 | | | | |
| Manganese nitrate | 0.007 | 0.007 | 0.0005 | 0.030 | 0.007 | 0.007 |
| Marcaptobenzothiazole soda | 0.4 | 0.4 | 0.4 | 0.4 | 0.4 | 0.4 |
| Sodium nitrate | 0.4 | 0.4 | 0.4 | 0.4 | 0.4 | 0.4 |
| Sodium benzoate | 5.0 | 5.0 | 5.0 | 5.0 | 5.0 | 5.0 |
| Sodium molybdate | 0.5 | 0.5 | 0.5 | 0.5 | 0.4 | 0.5 |
| Potassium hydroxide | 1.0 | 0.5 | 1.0 | 1.0 | 1.0 | |
| Sodium hydroxide | | | | | | 0.5 |
| Test for metal corrosion (mg/cm$^2$) | | | | | | |
| Cast aluminum | −0.03 | −0.02 | −0.02 | −0.00 | −0.03 | −0.02 |
| Cast aluminum | −0.01 | −0.05 | −0.04 | −0.01 | −0.04 | −0.05 |
| Steel | −0.01 | −0.00 | −0.01 | −0.01 | −0.00 | −0.01 |
| Brass | −0.01 | −0.04 | −0.02 | −0.05 | −0.04 | −0.02 |
| Solder | −0.04 | −0.08 | −0.08 | −0.06 | −0.05 | −0.06 |
| Copper | −0.01 | −0.00 | −0.05 | −0.02 | −0.05 | −0.03 |
| Appearance of test piece | no corrosion | no corrosion | no corrosion | no corrosion | no corrosion | no corrosion |

| | Control | | | | |
|---|---|---|---|---|---|
| | 22 | 23 | 24 | 25 | 26 |
| Composition of antifreeze (% by weight) | | | | | |
| Monoethylene glycol | 95 | 95 | 95 | 95 | 95 |
| Water | 5 | 5 | 5 | 5 | 5 |
| Phosphoric acid (85% by weight) | 1.5 | 1.5 | 1.5 | 1.5 | 1.5 |
| Potassium phosphate II | | | | | |
| Manganese nitrate | | 0.007 | 0.007 | 0.007 | 0.007 |
| Marcaptobenzothiazole soda | 0.4 | | 0.4 | 0.4 | 0.4 |
| Sodium nitrate | 0.4 | 0.4 | | 0.4 | 0.4 |
| Sodium benzoate | 5.0 | 5.0 | 5.0 | | 5.0 |
| Sodium molybdate | 0.5 | 0.5 | 0.5 | 0.5 | |
| Potassium hydroxide | 1.0 | 1.0 | 1.0 | 1.0 | 1.0 |
| Sodium hydroxide | | | | | |
| Test for metal corrosion (mg/cm$^2$) | | | | | |
| Cast aluminum | −1.23 | −0.55 | −0.69 | −0.50 | −1.52 |
| Cast aluminum | −0.43 | −0.42 | −0.54 | −1.34 | −0.33 |
| Steel | −0.11 | −0.38 | −0.29 | −0.32 | −0.15 |

TABLE 5-continued

| | | | | | |
|---|---|---|---|---|---|
| Brass | −0.44 | −0.13 | −0.35 | −0.27 | −0.17 |
| Solder | −0.24 | −0.51 | −0.23 | −0.46 | −0.65 |
| Copper | −0.08 | −0.17 | −0.18 | −0.11 | −0.09 |
| Appearance of test piece | corrosion | corrosion | corrosion | corrosion | corrosion |

EXAMPLES 32 to 37

Varying components indicated in Table 6 were dissolved in varying proportions indicated in Table 6 in 5 parts by weight of tap water or 95 parts by weight of monoethylene glycol and the two liquids were mixed.

The varying samples thus obtained were subjected to the following test and relevant measurement.

Test for metal corrosion

The results were as shown in Table 6.

TABLE 6

| Composition of antifreeze (% by weight) | Example | | | | | |
|---|---|---|---|---|---|---|
| | 32 | 33 | 34 | 35 | 36 | 37 |
| Monoethylene glycol | 95 | 95 | 95 | 95 | 95 | 95 |
| Water | 5 | 5 | 5 | 5 | 5 | 5 |
| Phosphoric acid (85% by weight) | 1.5 | | 1.5 | 1.5 | 1.5 | 1.5 |
| Potassium phosphate II | | 2.0 | | | | |
| Manganese nitrate | 0.007 | 0.007 | 0.0005 | 0.030 | 0.007 | 0.007 |
| Mercaptobenzothiazole soda | 0.4 | 0.4 | 0.4 | 0.4 | 0.4 | 0.4 |
| Sodium nitrate | 0.4 | 0.4 | 0.4 | 0.4 | 0.4 | 0.4 |
| Sodium benzoate | 5.0 | 5.0 | 5.0 | 5.0 | 5.0 | 5.0 |
| Malonic acid | 0.5 | 0.5 | 0.5 | 0.5 | 0.5 | 0.5 |
| Potassium hydroxide | 1.5 | 1.0 | 1.5 | 1.5 | 1.5 | |
| Sodium hydroxide | | | | | | 1.0 |
| Test for metal corrosion (mg/cm$^2$) | | | | | | |
| Cast aluminum | −0.02 | −0.07 | −0.00 | −0.04 | −0.05 | −0.08 |
| Cast iron | −0.02 | −0.08 | −0.07 | −0.09 | −0.01 | −0.09 |
| Steel | −0.03 | −0.01 | −0.07 | −0.04 | −0.08 | −0.06 |
| Brass | −0.05 | −0.03 | −0.08 | −0.02 | −0.03 | −0.06 |
| Solder | −0.08 | −0.09 | −0.03 | −0.04 | −0.06 | −0.06 |
| Copper | −0.07 | −0.06 | −0.04 | −0.08 | −0.08 | −0.01 |
| Appearance of test piece | no corrosion | no corrosion | no corrosion | no corrosion | no corrosion | no corrosion |

| Composition of antifreeze (% by weight) | Control | | | | |
|---|---|---|---|---|---|
| | 27 | 28 | 29 | 30 | 31 |
| Monoethylene glycol | 95 | 95 | 95 | 95 | 95 |
| Water | 5 | 5 | 5 | 5 | 5 |
| Phosphoric acid (85% by weight) | 1.5 | 1.5 | 1.5 | 1.5 | 1.5 |
| Potassium phosphate II | | | | | |
| Manganese nitrate | | 0.007 | 0.007 | 0.007 | 0.007 |
| Mercaptobenzothiazole soda | 0.4 | 0.4 | | 0.4 | 0.4 |
| Sodium nitrate | 0.4 | | 0.4 | 0.4 | 0.4 |
| Sodium benzoate | 5.0 | 5.0 | | 5.0 | 5.0 |
| Malonic acid | 0.5 | 0.5 | 0.5 | | |
| Potassium hydroxide | 1.5 | 1.5 | 1.5 | 1.5 | 1.0 |
| Sodium hydroxide | | | | | |
| Test for metal corrosion (mg/cm$^2$) | | | | | |
| Cast aluminum | −0.86 | −0.46 | −0.76 | −0.62 | −1.48 |
| Cast iron | −0.46 | −0.34 | −0.34 | −1.31 | −0.88 |
| Steel | −0.08 | −0.29 | −0.24 | −0.12 | −0.28 |
| Brass | −0.04 | −0.28 | −0.09 | −0.05 | −0.13 |
| Solder | −0.22 | −0.25 | −0.18 | −0.54 | −0.27 |
| Copper | −0.04 | −0.32 | −0.12 | −0.13 | −0.10 |
| Appearance of test piece | corrosion | corrosion | corrosion | corrosion | corrosion |

CONTROLS 27 to 31

Varying components indicated in Table 6 were dissolved in varying proportions indicated in Table 6 in 5 parts by weight of tap water or 95 parts by weight of monoethylene glycol and the two liquids were mixed.

The varying samples thus obtained were subjected to the following test and relevant measurement.

Test for metal corrosion

The results were as shown in Table 6.

EXAMPLES 38 to 44

Varying components indicated in Table 7 were dissolved in varying proportions indicated in Table 7 in 5 parts by weight of tap water or 95 parts by weight of monoethylene glycol and the two liquids were mixed.

The varying samples thus obtained were subjected to the following test and relevant measurement.

A : Test for metal corrosion
B : Test for corrosion of transferring surface

The results were as shown in Table 7.

CONTROLS 32 to 38

Samples were prepared by following the procedure of Example 38 to 44, except that varying components indicated in Table 7 were used in the proportions correspondingly shown in the same table. The samples were similarly tested. The results were as shown in Table 7.

TABLE 7

| Composition of antifreeze (% by weight) | Example | | | | | | |
|---|---|---|---|---|---|---|---|
| | 38 | 39 | 40 | 41 | 42 | 43 | 44 |
| Monoethylene glycol | 95 | 95 | 95 | 95 | 95 | 95 | 95 |
| Water | 5 | 5 | 5 | 5 | 5 | 5 | 5 |
| Phosphoric acid (85% by weight) | 1.5 | | 1.5 | 1.5 | 1.5 | 1.5 | 1.5 |
| Potassium phosphate II | | 2.0 | | | | | |
| Malonic acid | 0.5 | 0.5 | 0.5 | 0.5 | 0.5 | 0.5 | 0.5 |
| Manganese sulfate | 0.007 | 0.007 | 0.007 | 0.007 | 0.0005 | 0.030 | 0.007 |
| Mercaptobenzothiazole soda | 0.4 | 0.4 | 0.4 | 0.4 | 0.4 | 0.4 | 0.4 |
| Sodium nitrate | 0.4 | 0.4 | 0.4 | 0.4 | 0.4 | 0.4 | 0.4 |
| Sodium benzoate | 4.0 | 4.0 | 4.0 | 4.0 | 4.0 | 4.0 | 4.0 |
| Copolymer (1) | 0.05 | 0.05 | | | 0.05 | 0.05 | 0.05 |
| Copolymer (2) | | | 0.05 | | | | |
| Copolymer (3) | | | | 0.05 | | | |
| Potassium hydroxide | 1.8 | 0.8 | 1.8 | 1.8 | 1.8 | 1.8 | |
| Sodium hydroxide | | | | | | | 1.0 |
| Test for metal corrosion (mg/cm$^2$) | | | | | | | |
| Cast aluminum | −0.03 | −0.08 | −0.04 | −0.11 | −0.04 | −0.02 | −0.03 |
| Cast iron | −0.02 | −0.05 | −0.03 | −0.10 | −0.03 | −0.02 | −0.05 |
| Steel | −0.04 | −0.02 | −0.02 | −0.09 | −0.04 | −0.03 | −0.05 |
| Brass | −0.06 | −0.05 | −0.06 | −0.08 | −0.02 | −0.04 | −0.09 |
| Solder | −0.06 | −0.04 | −0.04 | −0.11 | −0.03 | −0.06 | −0.06 |
| Copper | −0.04 | −0.03 | −0.06 | −0.09 | −0.04 | −0.02 | −0.04 |
| Appearance | no corrosion | no corrosion | no corrosion | no corrosion | no corrosion | no corrosion | no corrosion |
| Test for corrosion of heat Transferring surface | | | | | | | |
| Change in mass of test piece (mg/cm$^3$) | −0.13 | −0.08 | −0.18 | −0.39 | −0.07 | −0.15 | −0.62 |
| pH before test | 7.7 | 7.7 | 7.7 | 7.7 | 7.7 | 7.7 | 7.7 |
| pH after test | 7.6 | 7.5 | 7.7 | 7.9 | 7.7 | 7.6 | 7.8 |
| Appearance of liquid after test | not changed | not changed | not changed | not changed | not changed | not changed | not changed |
| Appearance of test piece after test | not changed | not changed | not changed | not changed | not changed | not changed | not changed |

| Composition of antifreeze (% by weight) | Control | | | | | | |
|---|---|---|---|---|---|---|---|
| | 32 | 33 | 34 | 35 | 36 | 37 | 38 |
| Monoethylene glycol | 95 | 95 | 95 | 95 | 95 | 95 | 95 |
| Water | 5 | 5 | 5 | 5 | 5 | 5 | 5 |
| Phosphoric acid (85% by weight) | 1.5 | 1.5 | 1.5 | 1.5 | 1.5 | 1.5 | 1.5 |
| Potassium phosphate II | | | | | | | |
| Malonic acid | | 0.5 | 0.5 | 0.5 | 0.5 | 0.5 | 0.5 |
| Manganese sulfate | 0.007 | | 0.007 | 0.007 | 0.007 | 0.007 | 0.007 |
| Mercaptobenzothiazole soda | 0.4 | 0.4 | | 0.4 | 0.4 | 0.4 | 0.4 |
| Sodium nitrate | 0.4 | 0.4 | 0.4 | | 0.4 | 0.4 | 0.4 |
| Sodium benzoate | 4.0 | 4.0 | 4.0 | 4.0 | | 4.0 | 4.0 |
| Copolymer (1) | 0.05 | 0.05 | 0.05 | 0.05 | 0.05 | | 0.05 |
| Copolymer (2) | | | | | | | |
| Copolymer (3) | | | | | | | |
| Potassium hydroxide | 1.0 | 1.8 | 1.8 | 1.8 | 1.8 | 1.8 | |
| Sodium hydroxide | | | | | | | |
| Test for metal corrosion (mg/cm$^2$) | | | | | | | |
| Cast aluminum | −0.43 | −2.81 | −1.64 | −0.48 | −0.78 | −2.14 | −0.22 |
| Cast iron | −0.12 | −1.65 | −0.88 | −1.32 | −1.24 | −1.08 | −0.96 |
| Steel | −0.09 | −0.82 | −0.46 | −0.86 | −0.89 | −0.76 | −0.53 |
| Brass | −0.11 | −0.48 | −0.92 | −0.08 | −0.08 | −0.13 | −0.06 |
| Solder | −0.15 | −0.86 | −0.68 | −0.22 | −0.94 | −0.58 | −0.16 |
| Copper | −0.08 | −0.46 | −0.79 | −0.06 | −0.06 | −0.11 | −0.07 |
| Appearance | Note 5 | Note 1 | Note 1* | Note 1 | Note 2 | Note 2 | Note 7 |
| Test for corrosion of heat Transferring surface | | | | | | | |
| Change in mass of test piece (mg/cm$^3$) | −1.08 | −2.08 | −1.20 | −0.89 | −0.54 | −1.03 | −0.42 |
| pH before test | 7.9 | 7.7 | 7.6 | 7.7 | 7.7 | 7.7 | 6.2 |
| pH after test | 9.2 | 8.9 | 8.8 | 8.2 | 7.9 | 8.6 | 7.3 |
| Appearance of liquid after test | cl | cl | cl | cl | not changed | cl | not changed |
| Appearance of test piece after test | bk | bk | bk | bk | not changed | bk | bw |

Note 1: cast aluminum and cast iron corrosion
Note 2: cast aluminum, cast iron and solder corrosion
Note 5: squeezeout corrosion of cast aluminum
Note 7: cast iron and steel corrosion
*: copper changed color
cl: cloudy
bk: black
bw: brown

EXAMPLES 45 to 51

Varying components indicated in Table 8 were dissolved in varying proportions indicated in Table 8 in 5 parts by weight of tap water or 95 parts by weight of monoethylene glycol and the two liquids were mixed.

The varying samples thus obtained were subjected to the following test and relevant measurement.

A : Test for metal corrosion
B : Test for corrosion of transferring surface.
The results were as shown in Table 8.

CONTROLS 39 to 46

Samples were prepared by following the procedure of Examples 45 to 51, except that varying components indicated in Table 8 were used in the proportions correspondingly shown in the same table. The samples are similarly tested. The results were as shown in Table 8.

TABLE 8

| Composition of antifreeze | Example | | | | | | |
|---|---|---|---|---|---|---|---|
| (% by weight) | 45 | 46 | 47 | 48 | 49 | 50 | 51 |
| Monoethylene glycol | 95 | 95 | 95 | 95 | 95 | 95 | 95 |
| Water | 5 | 5 | 5 | 5 | 5 | 5 | 5 |
| Phosphoric acid (85% by weight) | 1.5 | | 1.5 | 1.5 | 1.5 | 1.5 | 1.5 |
| Potassium phosphate II | | 2.0 | | | | | |
| Malonic acid | 0.5 | 0.5 | 0.5 | 0.5 | 0.5 | 0.5 | 0.5 |
| Manganese nitrate | 0.007 | 0.007 | 0.007 | 0.007 | 0.0005 | 0.030 | 0.007 |
| Sodium molybdate | 0.5 | 0.5 | 0.5 | 0.5 | 0.5 | 0.5 | 0.5 |
| Mercaptobenzothiazole soda | 0.4 | 0.4 | 0.4 | 0.4 | 0.4 | 0.4 | 0.4 |
| Sodium nitrate | 0.4 | 0.4 | 0.4 | 0.4 | 0.4 | 0.4 | 0.4 |
| Sodium benzoate | 4.0 | 4.0 | 4.0 | 4.0 | 4.0 | 4.0 | 4.0 |
| Copolymer (1) | 0.05 | 0.05 | | | 0.05 | 0.05 | 0.05 |
| Copolymer (2) | | | 0.05 | | | | |
| Copolymer (3) | | | | 0.05 | | | |
| Potassium hydroxide | 1.8 | 0.8 | 1.8 | 1.8 | 1.8 | 1.8 | |
| Sodium hydroxide | | | | | | | 1.0 |
| Test for metal corrosion (mg/cm$^2$) | | | | | | | |
| Cast aluminum | −0.01 | −0.04 | −0.03 | −0.06 | −0.02 | −0.02 | −0.03 |
| Cast iron | −0.02 | −0.03 | −0.04 | −0.06 | −0.03 | −0.03 | −0.03 |
| Steel | −0.03 | −0.01 | −0.01 | −0.05 | −0.02 | −0.04 | −0.03 |
| Brass | −0.04 | −0.03 | −0.03 | −0.03 | −0.03 | −0.04 | −0.04 |
| Solder | −0.03 | −0.02 | −0.02 | −0.08 | −0.06 | −0.08 | −0.06 |
| Copper | −0.02 | −0.02 | −0.03 | −0.05 | −0.02 | −0.01 | −0.03 |
| Appearance | no corrosion | no corrosion | no corrosion | no corrosion | no corrosion | no corrosion | no corrosion |
| Test for corrosion of heat Transferring surface | | | | | | | |
| Change in mass of test piece (mg/cm$^3$) | −0.03 | −0.06 | −0.08 | −0.13 | −0.04 | −0.08 | −0.22 |
| pH before test | 7.7 | 7.7 | 7.7 | 7.7 | 7.7 | 7.7 | 7.7 |
| pH after test | 7.6 | 7.5 | 7.7 | 7.9 | 7.7 | 7.6 | 7.8 |
| Appearance of liquid after test | not changed | not changed | not changed | not changed | not changed | not changed | not changed |
| Appearance of test piece after test | not changed | not changed | not changed | not changed | not changed | not changed | not changed |

| Composition of antifreeze | Control | | | | | | | |
|---|---|---|---|---|---|---|---|---|
| (% by weight) | 39 | 40 | 41 | 42 | 43 | 44 | 45 | 46 |
| Monoethylene glycol | 95 | 95 | 95 | 95 | 95 | 95 | 95 | 95 |
| Water | 5 | 5 | 5 | 5 | 5 | 5 | 5 | 5 |
| Phosphoric acid (85% by weight) | 1.5 | 1.5 | 1.5 | 1.5 | 1.5 | 1.5 | 1.5 | 1.5 |
| Potassium phosphate II | | | | | | | | |
| Malonic acid | | 0.5 | 0.5 | 0.5 | 0.5 | 0.5 | 0.5 | 0.5 |
| Manganese nitrate | 0.007 | | 0.007 | 0.007 | 0.007 | 0.007 | 0.007 | 0.007 |
| Sodium molybdate | 0.5 | 0.5 | 0.5 | 0.5 | | 0.5 | 0.5 | 0.5 |
| Mercaptobenzothiazole soda | 0.4 | 0.4 | | 0.4 | 0.4 | 0.4 | 0.4 | 0.4 |
| Sodium nitrate | 0.4 | 0.4 | 0.4 | | 0.4 | 0.4 | 0.4 | 0.4 |
| Sodium benzoate | 4.0 | 4.0 | 4.0 | 4.0 | 4.0 | | 4.0 | 4.0 |
| Copolymer (1) | 0.05 | 0.05 | 0.05 | 0.05 | 0.05 | 0.05 | | 0.05 |
| Copolymer (2) | | | | | | | | |
| Copolymer (3) | | | | | | | | |
| Potassium hydroxide | 1.0 | 1.8 | 1.8 | 1.8 | 1.8 | 1.8 | 1.5 | |
| Sodium hydroxide | | | | | | | | |
| Test for metal corrosion (mg/cm$^2$) | | | | | | | | |
| Cast aluminum | −0.32 | −1.41 | −0.96 | −0.32 | −0.48 | −1.07 | −0.42 | −0.36 |
| Cast iron | −0.18 | −0.83 | −0.51 | −0.86 | −0.76 | −0.53 | −0.83 | −0.88 |
| Steel | −0.06 | −0.48 | −0.32 | −0.42 | −0.29 | −0.38 | −0.38 | −0.46 |
| Brass | −0.08 | −0.26 | −0.42 | −0.08 | −0.06 | −0.09 | −0.06 | −0.09 |
| Solder | −0.13 | −0.43 | −0.34 | −0.18 | −0.47 | −0.29 | −0.16 | −0.26 |
| Copper | −0.06 | −0.23 | −0.36 | −0.04 | −0.04 | −0.06 | −0.11 | −0.08 |
| Appearance | Note 5 | Note 1 | Note 1* | Note 1 | Note 2 | Note 2 | Note 1 | Note 7 |
| Test for corrosion of heat Transferring surface | | | | | | | | |
| Change in mass of test piece (mg/cm$^3$) | −0.78 | −1.04 | −1.02 | −0.69 | −0.46 | −0.98 | −0.11 | −0.48 |
| pH before test | 7.9 | 7.7 | 7.6 | 7.7 | 7.7 | 7.7 | 7.7 | 6.4 |
| pH after test | 8.5 | 8.3 | 7.9 | 8.1 | 8.0 | 8.7 | 8.8 | 7.5 |
| Appearance of liquid after test | cl | cl | cl | cl | not changed | cl | cl | not changed |

TABLE 8-continued

| Appearance of test piece after test | bk | bk | bk | bk | not changed | bk | gray | bw |
|---|---|---|---|---|---|---|---|---|

Note 1: cast aluminum and cast iron corrosion
Note 2: cast aluminum, cast iron and solder corrosion
Note 5: squeezeout corrosion of cast aluminum
Note 7: cast iron and steel corrosion
*: copper changed color
cl: cloudy
bk: black
bw: brown

EXAMPLES 52 to 58

Varying components indicated in Table 9 were dissolved in varying proportions indicated in Table 9 in 5 parts by weight of tap water or 95 parts by weight of monoethylene glycol and the two liquids were mixed.

The varying samples thus obtained were subjected to the following test and relevant measurement.

A : Test for metal corrosion

B : Test for corrosion of transferring surface
The results were as shown in Table 9.

CONTROLS 47 to 51

Samples were prepared by following the procedure of Examples 52 to 58, except that varying components indicated in Table 9 were used in the proportions correspondingly shown in the same table. The samples were similarly tested. The results were as shown in Table 9.

TABLE 9

| Composition of antifreeze | Example | | | | | | |
|---|---|---|---|---|---|---|---|
| (% by weight) | 52 | 53 | 54 | 55 | 56 | 57 | 58 |
| Monoethylene glycol | 95 | 95 | 95 | 95 | 95 | 95 | 95 |
| Water | 5 | 5 | 5 | 5 | 5 | 5 | 5 |
| Phosphoric acid (85% by weight) | 1.5 | | 1.5 | 1.5 | 1.5 | 1.5 | 1.5 |
| Potassium phosphate II | | 2.0 | | | | | |
| Phthalic acid | 0.3 | | 0.3 | 0.3 | 0.3 | 0.3 | 0.3 |
| Isophthalic acid | | 0.3 | | | | | |
| Manganese nitrate | 0.007 | 0.007 | 0.007 | 0.007 | 0.0005 | 0.030 | 0.007 |
| Mercaptobenzothiazole soda | 0.3 | 0.3 | 0.3 | 0.3 | 0.3 | 0.3 | 0.3 |
| Sodium nitrate | 0.4 | 0.4 | 0.4 | 0.4 | 0.4 | 0.4 | 0.4 |
| Sodium benzoate | 4.0 | 4.0 | 4.0 | 4.0 | 4.0 | 4.0 | 4.0 |
| Copolymer (1) | 0.05 | 0.05 | | | 0.05 | 0.05 | 0.05 |
| Copolymer (2) | | | 0.05 | | | | |
| Copolymer (3) | | | | 0.05 | | | |
| Potassium hydroxide | 1.8 | 0.8 | 1.8 | 1.8 | 1.8 | 1.8 | |
| Sodium hydroxide | | | | | | | 1.0 |
| Test for metal corrosion (mg/cm$^2$) | | | | | | | |
| Cast aluminum | −0.04 | −0.02 | −0.01 | −0.07 | −0.02 | −0.01 | −0.07 |
| Cast iron | −0.03 | −0.03 | −0.04 | −0.05 | −0.02 | −0.01 | −0.09 |
| Steel | −0.04 | −0.02 | −0.01 | −0.07 | −0.02 | −0.04 | −0.05 |
| Brass | −0.05 | −0.00 | −0.04 | −0.04 | −0.03 | −0.03 | −0.04 |
| Solder | −0.06 | −0.02 | −0.04 | −0.10 | −0.09 | −0.08 | −0.11 |
| Copper | −0.03 | −0.02 | −0.01 | −0.05 | −0.04 | −0.01 | −0.06 |
| Appearance | no corrosion | no corrosion | no corrosion | no corrosion | no corrosion | no corrosion | no corrosion |
| Test for corrosion of heat Transferring surface | | | | | | | |
| Change in mass of test piece (mg/cm$^3$) | −0.14 | −0.06 | −0.22 | −0.32 | −0.13 | −0.28 | −0.42 |
| pH before test | 7.7 | 7.7 | 7.7 | 7.7 | 7.7 | 7.7 | 7.7 |
| pH after test | 7.7 | 7.5 | 7.8 | 8.0 | 7.5 | 7.6 | 8.0 |
| Appearance of liquid after test | not changed | not changed | not changed | not changed | not changed | not changed | not changed |
| Appearance of test piece after test | not changed | not changed | not changed | not changed | not changed | not changed | not changed |

| Composition of antifreeze | Control | | | | |
|---|---|---|---|---|---|
| (% by weight) | 47 | 48 | 49 | 50 | 51 |
| Monoethylene glycol | 95 | 95 | 95 | 95 | 95 |
| Water | 5 | 5 | 5 | 5 | 5 |
| Phosphoric acid (85% by weight) | 1.5 | 1.5 | 1.5 | 1.5 | 1.5 |
| Potassium phosphate II | | | | | |
| Phthalic acid | 0.3 | 0.3 | 0.3 | 0.3 | 0.3 |
| Isophthalic acid | | | | | |
| Manganese nitrate | 0.007 | | 0.007 | 0.007 | 0.007 |
| Mercaptobenzothiazole soda | 0.3 | 0.3 | | 0.3 | 0.3 |
| Sodium nitrate | 0.4 | 0.4 | | 0.4 | 0.4 |
| Sodium benzoate | 4.0 | 4.0 | | 4.0 | 4.0 |
| Copolymer (1) | 0.05 | 0.05 | 0.05 | | 0.05 |
| Copolymer (2) | | | | | |
| Copolymer (3) | | | | | |
| Potassium hydroxide | 1.0 | 1.8 | 1.8 | 1.8 | |
| Sodium hydroxide | | | | | |
| Test for metal corrosion (mg/cm$^2$) | | | | | |
| Cast aluminum | −0.52 | −2.14 | −1.86 | −0.82 | −0.28 |
| Cast iron | −0.22 | −0.88 | −1.08 | −1.09 | −0.68 |

TABLE 9-continued

|  |  |  |  |  |  |
|---|---|---|---|---|---|
| Steel | −0.11 | −0.38 | −0.52 | −0.30 | −0.32 |
| Brass | −0.08 | −0.26 | −0.38 | −0.08 | −0.06 |
| Solder | −0.14 | −0.33 | −0.45 | −0.37 | −0.18 |
| Copper | −0.07 | −0.21 | −0.36 | −0.04 | −0.04 |
| Appearance | Note 5 | Note 1 | Note 2* | Note 1 | Note 7 |
| Test for corrosion of heat Transferring surface |  |  |  |  |  |
| Change in mass of test piece (mg/cm$^3$) | −1.35 | −3.12 | −1.02 | −0.69 | −0.46 |
| pH before test | 7.9 | 7.7 | 7.6 | 7.7 | 6.3 |
| pH after test | 9.0 | 9.3 | 7.9 | 8.1 | 8.0 |
| Appearance of liquid after test | cl | cl | cl | cl | not changed |
| Appearance of test piece after test | bk | bk | bk | bk | not changed |

Note 1: cast aluminum and cast iron corrosion
Note 2: cast aluminum, cast iron and solder corrosion
Note 5: squeezeout corrosion of cast aluminum
Note 7: cast iron and steel corrosion
*: copper changed color
cl: cloudy
bk: black
bw: brown

EXAMPLES 59 to 65

Varying components indicated in Table 10 were dissolved in varying proportions indicated in Table 10 in 5 parts by weight of tap water or 95 parts by weight of monoethylene glycol and the two liquids were mixed.

The varying samples thus obtained were subjected to the following test and relevant measurement.

Test for metal corrosion

The results were as shown in Table 10.

CONTROLS 52 to 55

Samples were prepared by following the procedure of EXAMPLES 59 to 65, except that varying components indicated in Table 10 were used in the proportions correspondingly shown in the same table. The samples were similarly tested. The results were as shown in Table 10.

TABLE 10

|  | Example |  |  |  |  |  |  |
|---|---|---|---|---|---|---|---|
|  | 59 | 60 | 61 | 62 | 63 | 64 | 65 |
| Composition of antifreeze (% by weight) |  |  |  |  |  |  |  |
| Monoethylene glycol Water | 95 | 95 | 95 | 95 | 95 | 95 | 95 |
| Water | 5 | 5 | 5 | 5 | 5 | 5 | 5 |
| Phosphoric acid (85% by weight) | 1.5 |  | 1.5 | 1.5 | 1.5 | 1.5 | 1.5 |
| Potassium phosphate II |  | 2.0 |  |  |  |  |  |
| Manganese nitrate | 0.007 | 0.007 | 0.007 | 0.007 | 0.0005 | 0.030 | 0.007 |
| Macrcaptobenzothiazole soda | 0.4 | 0.4 | 0.4 | 0.4 | 0.4 | 0.4 | 0.4 |
| Sodium nitrate | 0.4 | 0.4 | 0.4 | 0.4 | 0.4 | 0.4 | 0.4 |
| Sodium benzoate | 4.0 | 4.0 | 4.0 | 4.0 | 4.0 | 4.0 | 4.0 |
| Copolymer (1) | 0.05 | 0.05 |  |  | 0.05 | 0.05 | 0.05 |
| Copolymer (2) |  |  | 0.05 |  |  |  |  |
| Copolymer (3) |  |  |  | 0.05 |  |  |  |
| Potassium hydroxide | 1.0 | 0.4 | 1.0 | 1.0 | 1.0 | 1.0 |  |
| Sodium hydroxide |  |  |  |  |  |  | 0.5 |
| Test for metal corrosion (mg/cm$^2$) |  |  |  |  |  |  |  |
| Cast aluminum | −0.02 | −0.04 | −0.04 | −0.08 | −0.07 | −0.09 | −0.03 |
| Cast aluminum | −0.04 | −0.07 | −0.09 | −0.05 | −0.05 | −0.08 | −0.09 |
| Steel | −0.08 | −0.00 | −0.04 | −0.06 | −0.02 | −0.06 | −0.06 |
| Brass | −0.08 | −0.09 | −0.01 | −0.05 | −0.02 | −0.09 | −0.03 |
| Solder | −0.08 | −0.09 | −0.01 | −0.08 | −0.05 | −0.02 | −0.07 |
| Copper | −0.07 | −0.06 | −0.01 | −0.06 | −0.06 | −0.08 | −0.03 |
| Appearance of test piece | no corrosion | no corrosion | no corrosion | no corrosion | no corrosion | no corrosion | no corrosion |

|  | Control |  |  |  |
|---|---|---|---|---|
|  | 52 | 53 | 54 | 55 |
| Composition of antifreeze (% by weight) |  |  |  |  |
| Monoethylene glycol Water | 95 | 95 | 95 | 95 |
| Water | 5 | 5 | 5 | 5 |
| Phosphoric acid (85% by weight) | 1.5 | 1.5 | 1.5 | 1.5 |
| Potassium phosphate II |  |  |  |  |
| Manganese nitrate |  | 0.007 | 0.007 | 0.007 |
| Macrcaptobenzothiazole soda | 0.4 |  | 0.4 | 0.4 |
| Sodium nitrate | 0.4 |  | 0.4 | 0.4 |
| Sodium benzoate | 4.0 |  | 4.0 | 4.0 |
| Copolymer (1) | 0.05 | 0.05 |  | 0.5 |
| Copolymer (2) |  |  |  |  |
| Copolymer (3) |  |  |  |  |
| Potassium hydroxide | 1.0 | 1.0 | 1.0 |  |
| Sodium hydroxide |  |  |  |  |

TABLE 10-continued

| Test for metal corrosion (mg/cm$^2$) | | | | |
|---|---|---|---|---|
| Cast aluminum | −2.14 | −1.14 | −0.88 | −0.24 |
| Cast aluminum | −0.16 | −1.61 | −1.57 | −0.56 |
| Steel | −0.65 | −0.61 | −0.29 | −0.28 |
| Brass | −0.12 | −0.29 | −0.10 | −0.06 |
| Solder | −0.23 | −0.45 | −0.28 | −0.21 |
| Copper | −0.15 | −0.48 | −0.08 | −0.08 |
| Appearance of test piece | corrosion | corrosion | corrosion | corrosion |

EXAMPLES 66 to 73

Varying components indicated in Table 11 were dissolved in varying proportions indicated in Table 11 in 5 parts by weight of tap water or 95 parts by weight of monoethylene glycol and the two liquids were mixed.

The varying samples thus obtained were subjected to the following test and relevant measurement.

A : Test for metal corrosion

B : Test for corrosion of transferring surface
The results were as shown in Table 11.

CONTROLS 56 to 62

Samples were prepared by following the procedure of Example 66 to 73, except that varying components indicated in Table 11 were used in the proportions correspondingly shown in the same table. The samples were similarly tested. The results were as shown in Table 11.

TABLE 11

| Item | 66 | 67 | 68 | 69 | 70 | 71 | 72 | 73 |
|---|---|---|---|---|---|---|---|---|
| Composition of antifreeze (% by weight) | | | | | | | | |
| Monoethylene glycol | 95 | 95 | 95 | 95 | 95 | 95 | 95 | 95 |
| Water | 5 | 5 | 5 | 5 | 5 | 5 | 5 | 5 |
| Phosphoric acid (85% by weight) | 1.5 | | 1.5 | 1.5 | 1.5 | 1.5 | 1.5 | 1.5 |
| Potassium Phosphate II | | 2.0 | | | | | | |
| Phthalic acid | 0.3 | 0.3 | | 0.3 | 0.3 | 0.3 | 0.3 | 0.3 |
| Isophthalic acid | | | 0.3 | | | | | |
| Magnesium nitrate | 0.02 | 0.02 | 0.02 | 0.02 | 0.02 | 0.005 | 0.05 | 0.02 |
| Sodium molybdate | 0.5 | 0.5 | 0.5 | 0.5 | 0.5 | 0.5 | 0.5 | 0.5 |
| Sodium mercaptobenzothiazole | 0.3 | 0.3 | 0.3 | 0.3 | 0.3 | 0.3 | 0.3 | 0.3 |
| Methyl benzotriazole | 0.2 | 0.2 | 0.2 | 0.2 | 0.2 | 0.2 | 0.2 | 0.2 |
| Benzotriazole | 0.1 | 0.1 | 0.1 | 0.1 | 0.1 | 0.1 | 0.1 | 0.1 |
| Sodium nitrate | 0.4 | 0.4 | 0.4 | 0.4 | 0.4 | 0.4 | 0.4 | 0.4 |
| Sodium benzoate | 3.0 | 3.0 | 3.0 | 3.0 | 3.0 | 3.0 | 3.0 | 3.0 |
| Copolymer (1) | 0.05 | 0.05 | 0.05 | | | 0.05 | 0.05 | 0.05 |
| Copolymer (2) | | | | 0.05 | | | | |
| Copolymer (3) | | | | | 0.05 | | | |
| Potassium hydroxide | 1.8 | 0.8 | 1.8 | 1.8 | 1.8 | 1.8 | 1.8 | |
| Sodium hydroxide | | | | | | | | 0.8 |
| Test for metal corrosion (mg/cm$^2$) | | | | | | | | |
| Cast aluminum | −0.06 | −0.04 | −0.02 | −0.06 | −0.07 | −0.03 | −0.07 | −0.04 |
| Cast iron | −0.02 | −0.06 | −0.05 | −0.04 | −0.04 | −0.05 | −0.03 | −0.02 |
| Steel | −0.06 | −0.05 | −0.07 | −0.01 | −0.01 | −0.03 | −0.03 | −0.00 |
| Brass | −0.06 | −0.04 | −0.02 | −0.04 | −0.00 | −0.05 | −0.04 | −0.03 |
| Solder | −0.04 | −0.05 | −0.03 | −0.06 | −0.00 | −0.01 | −0.00 | −0.00 |
| Copper | −0.01 | −0.03 | −0.00 | −0.00 | −0.00 | −0.00 | −0.06 | −0.06 |
| Appearance | no corrosion | no corrosion | no corrosion | no corrosion | no corrosion | no corrosion | no corrosion | no corrosion |
| Test for corrosion of transferring surface | | | | | | | | |
| change in mass of test piece (mg/cm$^2$) | −0.04 | −0.06 | −0.09 | −0.13 | −0.12 | −0.18 | −0.20 | −0.07 |
| pH before test | 7.8 | 7.8 | 7.8 | 7.8 | 7.8 | 7.8 | 7.8 | 7.8 |
| pH after test | 7.8 | 7.8 | 7.8 | 7.7 | 7.8 | 7.8 | 7.8 | 7.8 |
| Appearance of solution after test | not changed | not changed | not changed | not changed | not changed | not changed | not changed | not changed |
| Appearance of test piece after test | not changed | not changed | not changed | not changed | not changed | not changed | not changed | not changed |

| Item | 56 | 57 | 58 | 59 | 60 | 61 | 62 |
|---|---|---|---|---|---|---|---|
| Composition of antifreeze (% by weight) | | | | | | | |
| Monoethylene glycol | 95 | 95 | 95 | 95 | 95 | 95 | 95 |
| Water | 5 | 5 | 5 | 5 | 5 | 5 | 5 |
| Phosphoric acid (85% by weight) | | 1.5 | 1.5 | 1.5 | 1.5 | 1.5 | 1.5 |
| Potassium Phosphate II | | | | | | | |
| Phthalic acid | 0.3 | | 0.3 | 0.3 | 0.3 | 0.3 | 0.3 |
| Isophthalic acid | | | | | | | |
| Magnesium nitrate | 0.02 | 0.02 | | 0.02 | | 0.02 | 0.02 |
| Sodium molybdate | 0.5 | 0.5 | 0.5 | | 0.5 | 0.5 | 0.5 |
| Sodium mercaptobenzothiazole | 0.3 | 0.3 | 0.3 | 0.3 | | 0.3 | 0.3 |
| Methyl benzotriazole | 0.2 | 0.2 | 0.2 | 0.2 | | 0.2 | 0.2 |
| Benzotriazole | 0.1 | 0.1 | 0.1 | 0.1 | | 0.1 | 0.1 |
| Sodium nitrate | 0.4 | 0.4 | 0.4 | 0.4 | | 0.4 | 0.4 |
| Sodium benzoate | 3.0 | 3.0 | 3.0 | 3.0 | | | 3.0 |
| Copolymer (1) | 0.05 | 0.05 | 0.05 | 0.05 | 0.05 | | 0.05 |

TABLE 11-continued

|  |  |  |  |  |  |  |  |
|---|---|---|---|---|---|---|---|
| Copolymer (2) |  |  |  |  |  |  |  |
| Copolymer (3) |  |  |  |  |  |  |  |
| Potassium hydroxide | 0.8 | 1.0 | 1.8 | 1.8 | 1.8 | 1.8 |  |
| Sodium hydroxide |  |  |  |  |  |  |  |
| Test for metal corrosion (mg/cm$^2$) |  |  |  |  |  |  |  |
| Cast aluminum | −1.61 | −0.98 | −1.38 | −2.20 | −3.66 | −0.08 | −0.20 |
| Cast iron | −0.02 | −0.19 | −0.50 | −0.64 | −1.36 | −0.25 | −0.31 |
| Steel | −0.07 | −0.02 | −0.13 | −0.54 | −0.19 | −0.13 | −0.24 |
| Brass | −0.19 | −0.02 | −0.16 | −0.11 | −0.21 | −0.06 | −0.06 |
| Solder | −0.82 | −0.02 | −0.19 | −0.22 | −1.12 | −0.09 | −0.04 |
| Copper | −0.04 | −0.06 | −0.02 | −0.16 | −0.16 | −0.02 | −0.12 |
| Appearance | Note 4 | Note 5 | Note 1 | Note 1 | Note 4 | Note 6 | Note 1 |
| Test for corrosion of transferring surface |  |  |  |  |  |  |  |
| change in mass of test piece (mg/cm$^2$) | −2.67 | −1.54 | −4.45 | −2.26 | −1.69 | −0.12 | −0.89 |
| pH before test | 7.8 | 8.2 | 7.9 | 7.7 | 7.8 | 7.8 | 6.4 |
| pH after test | 9.8 | 9.2 | 8.5 | 9.4 | 9.2 | 7.8 | 7.4 |
| Appearance of solution after test | cl | cl | cl | cl | cl | not changed | not changed |
| Appearance of test piece after test | bk | bw | bk | bk | bk | not changed | not changed |

Note 1: cast aluminum and cast iron corrosion
Note 4: squeeze-out corrosion of cast aluminum and cast iron
Note 5: squeeze-out corrosion of cast aluminum
Note 6: squeeze-out corrosion of cast iron
bw: blown
cl: cloudy
bk: black

EXAMPLES 67 to 89

Varying components indicated in Tables 12 through 15 were dissolved in varying proportions indicated in Tables 12 through 15 in 5 parts by weight of tap water or 95 parts by weight of monoethylene glycol and the two liquids were mixed.

The varying samples thus obtained were subjected to the following test and relevant measurement.

Test for metal corrosion

The results were as shown in Tables 12 through 15.

CONTROLS 63 to 81

Varying components indicated in Tables 12 through 15 were dissolved in varying proportions indicated in Tables 12 through 15 in 5 parts by weight of tap water or 95 parts by weight of monoethylene glycol and the two liquids were mixed.

The varying samples thus obtained were subjected to the following test and relevant measurement.

Test for metal corrosion

The results were as shown in Tables 12 through 15.

TABLE 12

|  | Example | | | | | |
|---|---|---|---|---|---|---|
|  | 67 | 68 | 69 | 70 | 71 | 72 |
| Composition of antifreeze (% by weight) |  |  |  |  |  |  |
| Monoethylene glycol | 95 | 95 | 95 | 95 | 95 | 95 |
| Water | 5 | 5 | 5 | 5 | 5 | 5 |
| Phosphoric acid (85% by weight) | 1.5 |  | 1.5 | 1.5 | 1.5 | 1.5 |
| Potassium phosphate II |  | 2.0 |  |  |  |  |
| Magnesium nitrate | 0.02 | 0.02 | 0.005 | 0.05 | 0.02 | 0.02 |
| Mercaptobenzothiazole soda | 0.4 | 0.4 | 0.4 | 0.4 | 0.4 | 0.4 |
| Sodium nitrate | 0.4 | 0.4 | 0.4 | 0.4 | 0.4 | 0.4 |
| Sodium benzoate | 5.0 | 5.0 | 5.0 | 5.0 | 5.0 | 5.0 |
| Phthalic acid | 0.3 | 0.3 | 0.3 | 0.3 |  | 0.3 |
| Isophthalic acid |  |  |  |  | 0.3 |  |
| Potassium hydroxide | 1.8 | 1.2 | 1.8 | 1.8 | 1.8 |  |
| Sodium hydroxide |  |  |  |  |  | 0.8 |
| Test for metal corrosion (mg/cm$^2$) |  |  |  |  |  |  |
| Cast aluminum | −0.03 | −0.05 | −0.01 | −0.05 | −0.06 | −0.01 |
| Cast iron | −0.03 | −0.06 | −0.04 | −0.05 | −0.01 | −0.02 |
| Steel | −0.05 | −0.05 | −0.06 | −0.06 | −0.06 | −0.03 |
| Brass | −0.03 | −0.01 | −0.03 | −0.02 | −0.06 | −0.02 |
| Solder | −0.05 | −0.01 | −0.01 | −0.03 | −0.01 | −0.06 |
| Copper | −0.04 | −0.05 | −0.05 | −0.05 | −0.06 | −0.02 |
| Appearance of test piece | no corrosion | no corrosion | no corrosion | no corrosion | no corrosion | no corrosion |

|  | Control | | | | |
|---|---|---|---|---|---|
|  | 63 | 64 | 65 | 66 | 67 |
| Composition of antifreeze (% by weight) |  |  |  |  |  |
| Monoethylene glycol | 95 | 95 | 95 | 95 | 95 |
| Water | 5 | 5 | 5 | 5 | 5 |
| Phosphoric acid (85% by weight) | 1.5 | 1.5 | 1.5 | 1.5 | 1.5 |
| Potassium phosphate II |  |  |  |  |  |
| Magnesium nitrate |  | 0.02 | 0.02 | 0.02 | 0.02 |

TABLE 12-continued

| | | | | | |
|---|---|---|---|---|---|
| Mercaptobenzothiazole soda | 0.4 | | 0.4 | 0.4 | 0.4 |
| Sodium nitrate | 0.4 | 0.4 | | 0.4 | 0.4 |
| Sodium benzoate | 5.0 | 5.0 | 5.0 | | 5.0 |
| Phthalic acid | 0.3 | 0.3 | 0.3 | 0.3 | |
| Isophthalic acid | | | | | |
| Potassium hydroxide | 1.8 | 1.8 | 1.8 | 1.8 | 1.0 |
| Sodium hydroxide | | | | | |
| Test for metal corrosion (mg/cm$^2$) | | | | | |
| Cast aluminum | −1.27 | −0.86 | −0.51 | −0.13 | −0.94 |
| Cast iron | −0.13 | −0.57 | −0.40 | −1.26 | −0.21 |
| Steel | −0.08 | −0.30 | −0.27 | −0.10 | −0.06 |
| Brass | −0.04 | −0.13 | −0.09 | −0.06 | −0.13 |
| Solder | −0.23 | −0.32 | −0.22 | −0.55 | −0.19 |
| Copper | −0.06 | −0.18 | −0.04 | −0.13 | −0.08 |
| Appearance of test piece | corrosion | corrosion | corrosion | corrosion | corrosion |

TABLE 13

| | Example | | | | | |
|---|---|---|---|---|---|---|
| | 73 | 74 | 75 | 76 | 77 | 78 |
| Composition of antifreeze (% by weight) | | | | | | |
| Monoethylene glycol | 95 | 95 | 95 | 95 | 95 | 95 |
| Water | 5 | 5 | 5 | 5 | 5 | 5 |
| Phosphoric acid (85% by weight) | 1.5 | | 1.5 | 1.5 | 1.5 | 1.5 |
| Potassium phosphate II | | 2.0 | | | | |
| Magnesium nitrate | 0.02 | 0.02 | 0.005 | 0.05 | 0.02 | 0.02 |
| Marcaptobenzothiazole soda | 0.4 | 0.4 | 0.4 | 0.4 | 0.4 | 0.4 |
| Sodium nitrate | 0.4 | 0.4 | 0.4 | 0.4 | 0.4 | 0.4 |
| Sodium benzoate | 5.0 | 5.0 | 5.0 | 5.0 | 5.0 | 5.0 |
| Sodium molybdate | 0.5 | 0.5 | 0.5 | 0.5 | 0.5 | 0.5 |
| Potassium hydroxide | 1.0 | 0.5 | 1.0 | 1.0 | 1.0 | |
| Sodium hydroxide | | | | | | 0.5 |
| Test for metal corrosion (mg/cm$^2$) | | | | | | |
| Cast aluminum | −0.04 | −0.04 | −0.04 | −0.00 | −0.04 | −0.00 |
| Cast aluminum | −0.01 | −0.00 | −0.03 | −0.02 | −0.05 | −0.03 |
| Steel | −0.02 | −0.05 | −0.05 | −0.05 | −0.04 | −0.04 |
| Brass | −0.04 | −0.02 | −0.04 | −0.02 | −0.01 | −0.00 |
| Solder | −0.04 | −0.05 | −0.02 | −0.04 | −0.02 | −0.05 |
| Copper | −0.01 | −0.04 | −0.01 | −0.02 | −0.00 | −0.00 |
| Appearance of test piece | no corrosion | no corrosion | no corrosion | no corrosion | no corrosion | no corrosion |

| | Control | | | | |
|---|---|---|---|---|---|
| | 68 | 69 | 70 | 71 | 72 |
| Composition of antifreeze (% by weight) | | | | | |
| Monoethylene glycol | 95 | 95 | 95 | 95 | 95 |
| Water | 5 | 5 | 5 | 5 | 5 |
| Phosphoric acid (85% by weight) | 1.5 | 1.5 | 1.5 | 1.5 | 1.5 |
| Potassium phosphate II | | | | | |
| Magnesium nitrate | | 0.02 | 0.02 | 0.02 | 0.02 |
| Marcaptobenzothiazole soda | 0.4 | | 0.4 | 0.4 | 0.4 |
| Sodium nitrate | 0.4 | 0.4 | | 0.4 | 0.4 |
| Sodium benzoate | 5.0 | 5.0 | 5.0 | | 5.0 |
| Sodium molybdate | 0.5 | 0.5 | 0.5 | 0.5 | |
| Potassium hydroxide | 1.0 | 1.0 | 1.0 | 1.0 | 1.0 |
| Sodium hydroxide | | | | | |
| Test for metal corrosion (mg/cm$^2$) | | | | | |
| Cast aluminum | −1.22 | −0.82 | −0.51 | −0.48 | −1.11 |
| Cast aluminum | −0.24 | −0.47 | −0.40 | −1.30 | −0.31 |
| Steel | −0.10 | −0.38 | −0.31 | −0.09 | −0.08 |
| Brass | −0.24 | −0.13 | −0.29 | −0.16 | −0.18 |
| Solder | −0.33 | −0.42 | −0.22 | −0.45 | −0.49 |
| Copper | −0.06 | −0.18 | −0.24 | −0.13 | −0.08 |
| Appearance of test piece | corrosion | corrosion | corrosion | corrosion | corrosion |

TABLE 14

| | Example | | | | | |
|---|---|---|---|---|---|---|
| | 79 | 80 | 81 | 82 | 83 | 84 |
| Composition of antifreeze (% by weight) | | | | | | |
| Monoethylene glycol | 95 | 95 | 95 | 95 | 95 | 95 |
| Water | 5 | 5 | 5 | 5 | 5 | 5 |
| Phosphoric acid (85% by weight) | 1.5 | | 1.5 | 1.5 | 1.5 | 1.5 |
| Potassium phosphate II | | 2.0 | | | | |
| Magnesium nitrate | 0.02 | 0.02 | 0.005 | 0.05 | 0.02 | 0.02 |

TABLE 14-continued

|  | | | | | | |
|---|---|---|---|---|---|---|
| Mercaptobenzothiazole soda | 0.4 | 0.4 | 0.4 | 0.4 | 0.4 | 0.4 |
| Sodium nitrate | 0.4 | 0.4 | 0.4 | 0.4 | 0.4 | 0.4 |
| Sodium benzoate | 5.0 | 5.0 | 5.0 | 5.0 | 5.0 | 5.0 |
| Malonic acid | 0.5 | 0.5 | 0.5 | 0.5 | 0.5 | 0.5 |
| Potassium hydroxide | 1.5 | 0.7 | 1.5 | 1.5 | 1.5 | |
| Sodium hydroxide | | | | | | 0.7 |
| Test for metal corrosion (mg/cm$^2$) | | | | | | |
| Cast aluminum | −0.08 | −0.02 | −0.04 | −0.03 | −0.02 | −0.08 |
| Cast iron | −0.07 | −0.04 | −0.03 | −0.08 | −0.07 | −0.02 |
| Steel | −0.06 | −0.03 | −0.00 | −0.08 | −0.02 | −0.08 |
| Brass | −0.04 | −0.05 | −0.00 | −0.06 | −0.03 | −0.00 |
| Solder | −0.01 | −0.03 | −0.03 | −0.05 | −0.00 | −0.01 |
| Copper | −0.08 | −0.01 | −0.07 | −0.05 | −0.06 | −0.02 |
| Appearance of test piece | no corrosion | no corrosion | no corrosion | no corrosion | no corrosion | no corrosion |

| | Control | | | | |
|---|---|---|---|---|---|
| | 73 | 74 | 75 | 76 | 77 |
| Composition of antifreeze (% by weight) | | | | | |
| Monoethylene glycol | 95 | 95 | 95 | 95 | 95 |
| Water | 5 | 5 | 5 | 5 | 5 |
| Phosphoric acid (85% by weight) | 1.5 | 1.5 | 1.5 | 1.5 | 1.5 |
| Potassium phosphate II | | | | | |
| Magnesium nitrate | | 0.02 | 0.02 | 0.02 | 0.02 |
| Mercaptobenzothiazole soda | 0.4 | | 0.4 | 0.4 | 0.4 |
| Sodium nitrate | 0.4 | 0.4 | | 0.4 | 0.4 |
| Sodium benzoate | 5.0 | 5.0 | 5.0 | | 5.0 |
| Malonic acid | 0.5 | 0.5 | 0.5 | 0.5 | |
| Potassium hydroxide | 1.5 | 1.5 | 1.5 | 1.5 | 1.0 |
| Sodium hydroxide | | | | | |
| Test for metal corrosion (mg/cm$^2$) | | | | | |
| Cast aluminum | −0.84 | −0.46 | −0.56 | −0.56 | −1.48 |
| Cast iron | −0.44 | −0.37 | −0.30 | −1.30 | −0.51 |
| Steel | −0.07 | −0.28 | −0.21 | −0.13 | −0.18 |
| Brass | −0.04 | −0.23 | −0.09 | −0.06 | −0.12 |
| Solder | −0.23 | −0.32 | −0.20 | −0.43 | −0.23 |
| Copper | −0.06 | −0.28 | −0.14 | −0.13 | −0.08 |
| Appearance of test piece | corrosion | corrosion | corrosion | corrosion | corrosion |

TABLE 15

| Composition of antifreeze (% by weight) | Example | | | | | Control | | | |
|---|---|---|---|---|---|---|---|---|---|
| | 85 | 86 | 87 | 88 | 89 | 78 | 79 | 80 | 81 |
| Monoethylene glycol | 95 | 95 | 95 | 95 | 95 | 95 | 95 | 95 | 95 |
| Water | 3 | 3 | 3 | 3 | 3 | 3 | 3 | 3 | 3 |
| Phosphoric acid (85% by weight) | 1.5 | | 1.5 | 1.5 | 1.5 | 1.5 | 1.5 | 1.5 | 1.5 |
| Potassium phosphate II | | 2.0 | | | | | | | |
| Manganese nitrate | 0.02 | 0.02 | 0.005 | 0.05 | 0.02 | | 0.02 | 0.02 | 0.02 |
| Mercaptobenzothiazole soda | 0.4 | 0.4 | 0.4 | 0.4 | 0.4 | 0.4 | | 0.4 | 0.4 |
| Sodium nitrate | 0.4 | 0.4 | 0.4 | 0.4 | 0.4 | 0.4 | 0.4 | | 0.4 |
| Sodium benzoate | 5.0 | 5.0 | 5.0 | 5.0 | 5.0 | 5.0 | 5.0 | 5.0 | |
| Potassium hydroxide | 1.0 | 0.5 | 1.0 | 1.0 | | 1.0 | 1.0 | 1.0 | 1.0 |
| Sodium hydroxide | | | | | 0.5 | | | | |
| Test for metal corrosion (mg/cm$^2$) | | | | | | | | | |
| Cast aluminum | −0.02 | −0.02 | −0.01 | −0.04 | −0.01 | −0.79 | −0.52 | −0.28 | −0.32 |
| Cast iron | −0.02 | −0.03 | −0.00 | −0.05 | −0.01 | −0.58 | −0.13 | −0.31 | −0.40 |
| Steel | −0.00 | −0.01 | −0.00 | −0.05 | −0.05 | −0.33 | −0.28 | −0.20 | −0.17 |
| Brass | −0.05 | −0.03 | −0.01 | −0.05 | −0.00 | −0.05 | 0.34 | −0.03 | −0.09 |
| Solder | −0.04 | −0.04 | −0.03 | −0.03 | −0.00 | −0.21 | 0.30 | −0.12 | −0.22 |
| Copper | −0.00 | −0.05 | −0.01 | −0.03 | −0.02 | −0.02 | −0.26 | −0.06 | −0.04 |
| Appearance of test piece | no corrosion | no corrosion | no corrosion | no corrosion | no corrosion | corrosion | corrosion | corrosion | corrosion |

EXAMPLES 90 to 110

Varying components indicated in Tables 16 through 19 were dissolved in varying proportions indicated in Tables 16 through 19 in 5 parts by weight of tap water or 95 parts by weight of monoethylene glycol and the two liquids were mixed.

The varying samples thus obtained were subjected to the following test and relevant measurement.

A : Test for metal corrosion

B : Test for corrosion of transferring surface
The results were as shown in Table 7.

CONTROLS 82 to 101

Samples were prepared by following the procedure of Examples 90 to 110, except that varying components indicated in Tables 16 through 18 were used in the proportions correspondingly shown in the same table. The samples were similarly tested. The results were as shown in Tables 16 through 18.

TABLE 16

| Composition of antifreeze | Example |
|---|---|

TABLE 16-continued

| (% by weight) | 90 | 91 | 92 | 93 | 94 | 95 | 96 |
|---|---|---|---|---|---|---|---|
| Monoethylene glycol | 95 | 95 | 95 | 95 | 95 | 95 | 95 |
| Water | 5 | 5 | 5 | 5 | 5 | 5 | 5 |
| Phosphoric acid (85% by weight) | 1.5 | | 1.5 | 1.5 | 1.5 | 1.5 | 1.5 |
| Potassium phosphate II | | 2.0 | | | | | |
| Malonic acid | 0.5 | 0.5 | 0.5 | 0.5 | 0.5 | 0.5 | 0.5 |
| Magnesium nitrate | 0.02 | 0.02 | 0.02 | 0.02 | 0.005 | 0.05 | 0.02 |
| Sodium molybdate | 0.5 | 0.5 | 0.5 | 0.5 | 0.5 | 0.5 | 0.5 |
| Mercaptobenzothiazole soda | 0.4 | 0.4 | 0.4 | 0.4 | 0.4 | 0.4 | 0.4 |
| Sodium nitrate | 0.4 | 0.4 | 0.4 | 0.4 | 0.4 | 0.4 | 0.4 |
| Sodium benzoate | 4.0 | 4.0 | 4.0 | 4.0 | 4.0 | 4.0 | 4.0 |
| Copolymer (1) | 0.05 | 0.05 | | | 0.05 | 0.05 | 0.05 |
| Copolymer (2) | | | 0.05 | | | | |
| Copolymer (3) | | | | 0.05 | | | |
| Potassium hydroxide | 1.8 | 0.8 | 1.8 | 1.8 | 1.8 | 1.8 | |
| Sodium hydroxide | | | | | | | 1.0 |
| Test for metal corrosion (mg/cm$^2$) | | | | | | | |
| Cast aluminum | −0.02 | −0.00 | −0.02 | −0.01 | −0.02 | −0.04 | −0.01 |
| Cast iron | −0.03 | −0.04 | −0.02 | −0.01 | −0.03 | −0.04 | −0.02 |
| Steel | −0.03 | −0.02 | −0.00 | −0.01 | −0.00 | −0.04 | −0.00 |
| Brass | −0.01 | −0.00 | −0.03 | −0.01 | −0.01 | −0.03 | −0.01 |
| Solder | −0.04 | −0.04 | −0.03 | −0.04 | −0.02 | −0.03 | −0.03 |
| Copper | −0.02 | −0.00 | −0.03 | −0.04 | −0.03 | −0.04 | −0.00 |
| Appearance | no corrosion | no corrosion | no corrosion | no corrosion | no corrosion | no corrosion | no corrosion |
| Test for corrosion of heat Transferring surface | | | | | | | |
| Change in mass of test piece (mg/cm$^3$) | −0.02 | −0.08 | −0.07 | −0.03 | −0.07 | −0.10 | −0.08 |
| pH before test | 7.8 | 7.8 | 7.8 | 7.8 | 7.8 | 7.8 | 7.8 |
| pH after test | 7.8 | 7.8 | 7.8 | 7.8 | 7.6 | 7.8 | 7.8 |
| Appearance of liquid after test | not changed | not changed | not changed | not changed | not changed | not changed | not changed |
| Appearance of test piece after test | not changed | not changed | not changed | not changed | not changed | not changed | not changed |

| Composition of antifreeze | Control | | | | | | | |
|---|---|---|---|---|---|---|---|---|
| (% by weight) | 82 | 83 | 84 | 85 | 86 | 87 | 88 | 89 |
| Monoethylene glycol | 95 | 95 | 95 | 95 | 95 | 95 | 95 | 95 |
| Water | 5 | 5 | 5 | 5 | 5 | 5 | 5 | 5 |
| Phosphoric acid (85% by weight) | 1.5 | 1.5 | 1.5 | 1.5 | 1.5 | 1.5 | 1.5 | 1.5 |
| Potassium phosphate II | | | | | | | | |
| Malonic acid | | 0.5 | 0.5 | 0.5 | 0.5 | 0.5 | 0.5 | 0.5 |
| Magnesium nitrate | 0.02 | | 0.02 | 0.02 | 0.02 | 0.02 | 0.02 | 0.2 |
| Sodium molybdate | 0.5 | 0.5 | | 0.5 | 0.5 | 0.5 | 0.5 | 0.5 |
| Mercaptobenzothiazole soda | 0.4 | 0.4 | 0.4 | | 0.4 | 0.4 | 0.4 | 0.4 |
| Sodium nitrate | 0.4 | 0.4 | 0.4 | 0.4 | | 0.4 | | 0.4 |
| Sodium benzoate | 4.0 | 4.0 | 4.0 | 4.0 | 4.0 | | 4.0 | 4.0 |
| Copolymer (1) | 0.05 | 0.05 | 0.05 | 0.05 | 0.05 | 0.05 | | 0.05 |
| Copolymer (2) | | | | | | | | |
| Copolymer (3) | | | | | | | | |
| Potassium hydroxide | 1.0 | 1.8 | 1.8 | 1.8 | 1.8 | 1.8 | | |
| Sodium hydroxide | | | | | | | | |
| Test for metal corrosion (mg/cm$^2$) | | | | | | | | |
| Cast aluminum | −0.34 | −1.46 | −0.99 | −0.38 | −0.52 | −1.68 | −0.38 | −0.20 |
| Cast iron | −0.12 | −0.78 | −0.49 | −0.60 | −0.64 | −0.66 | −0.65 | −0.31 |
| Steel | −0.08 | −0.47 | −0.42 | −0.13 | −0.24 | −0.29 | −0.43 | −0.24 |
| Brass | −0.11 | −0.29 | −0.42 | −0.06 | −0.11 | −0.11 | −0.06 | −0.06 |
| Solder | −0.18 | −0.22 | −0.22 | −0.19 | −0.42 | −0.60 | −0.19 | −0.04 |
| Copper | −0.06 | −0.24 | −0.46 | −0.06 | −0.09 | −0.06 | −0.09 | −0.12 |
| Appearance | Note 5 | Note 1 | Note 1* | Note 1 | Note 2 | Note 2 | Note 1 | Note 7 |
| Test for corrosion of heat Transferring surface | | | | | | | | |
| Change in mass of test piece (mg/cm$^3$) | −0.58 | −1.67 | −2.34 | −1.45 | −1.26 | −1.29 | −0.18 | −0.79 |
| pH before test | 7.8 | 7.8 | 8.2 | 7.9 | 7.7 | 7.8 | 7.8 | 6.4 |
| pH after test | 8.8 | 9.2 | 9.2 | 8.5 | 9.4 | 9.0 | 7.8 | 7.4 |
| Appearance of liquid after test | not changed | cl | cl | cl | cl | cl | not changed | not changed |
| Appearance of test piece after test | not changed | bk | bw | bk | bk | bk | not changed | bw |

Note 1: cast aluminum and cast iron corrosion
Note 2: cast aluminum, cast iron and solder corrosion
Note 5: squeezeout corrosion of cast aluminum
Note 7: cast iron and steel corrosion
*: copper changed color
cl: cloudy
bk: black
bw: brown

TABLE 17

| Composition of antifreeze (% by weight) | Example | | | | | | |
|---|---|---|---|---|---|---|---|
| | 97 | 98 | 99 | 100 | 101 | 102 | 103 |
| Monoethylene glycol | 95 | 95 | 95 | 95 | 95 | 95 | 95 |
| Water | 5 | 5 | 5 | 5 | 5 | 5 | 5 |
| Phosphoric acid (85% by weight) | 1.5 | | 1.5 | 1.5 | 1.5 | 1.5 | 1.5 |
| Potassium phosphate II | | 2.0 | | | | | |
| Malonic acid | 0.5 | 0.5 | 0.5 | 0.5 | 0.5 | 0.5 | 0.5 |
| Magnesium nitrate | 0.02 | 0.02 | 0.02 | 0.02 | 0.005 | 0.05 | 0.02 |
| Mercaptobenzothiazole soda | 0.4 | 0.4 | 0.4 | 0.4 | 0.4 | 0.4 | 0.4 |
| Sodium nitrate | 0.4 | 0.4 | 0.4 | 0.4 | 0.4 | 0.4 | 0.4 |
| Sodium benzoate | 4.0 | 4.0 | 4.0 | 4.0 | 4.0 | 4.0 | 4.0 |
| Copolymer (1) | 0.05 | 0.05 | | | 0.05 | 0.05 | 0.05 |
| Copolymer (2) | | | 0.05 | | | | |
| Copolymer (3) | | | | 0.05 | | | |
| Potassium hydroxide | 1.8 | 0.8 | 1.8 | 1.8 | 1.8 | 1.8 | |
| Sodium hydroxide | | | | | | | 1.0 |
| Test for metal corrosion (mg/cm$^2$) | | | | | | | |
| Cast aluminum | −0.02 | −0.02 | −0.04 | −0.03 | −0.06 | −0.05 | −0.06 |
| Cast iron | −0.05 | −0.00 | −0.00 | −0.07 | −0.05 | −0.04 | −0.06 |
| Steel | −0.06 | −0.07 | −0.07 | −0.02 | −0.02 | −0.00 | −0.05 |
| Brass | −0.07 | −0.03 | −0.03 | −0.08 | −0.00 | −0.03 | −0.03 |
| Solder | −0.09 | −0.07 | −0.09 | −0.05 | −0.07 | −0.05 | −0.09 |
| Copper | −0.08 | −0.05 | −0.07 | −0.02 | −0.01 | −0.04 | −0.03 |
| Appearance | no corrosion | no corrosion | no corrosion | no corrosion | no corrosion | no corrosion | no corrosion |
| Test for corrosion of heat Transferring surface | | | | | | | |
| Change in mass of test piece (mg/cm$^3$) | −0.03 | −0.06 | −0.08 | −0.06 | −0.07 | −0.10 | −0.02 |
| pH before test | 7.8 | 7.8 | 7.8 | 7.8 | 7.8 | 7.8 | 7.8 |
| pH after test | 7.8 | 7.8 | 7.8 | 7.8 | 7.6 | 7.9 | 7.8 |
| Appearance of liquid after test | not changed | not changed | not changed | not changed | not changed | not changed | not changed |
| Appearance of test piece after test | not changed | not changed | not changed | not changed | not changed | not changed | not changed |

| Composition of antifreeze (% by weight) | Control | | | | | | |
|---|---|---|---|---|---|---|---|
| | 90 | 91 | 92 | 93 | 94 | 95 | 96 |
| Monoethylene glycol | 95 | 95 | 95 | 95 | 95 | 95 | 95 |
| Water | 5 | 5 | 5 | 5 | 5 | 5 | 5 |
| Phosphoric acid (85% by weight) | 1.5 | 1.5 | 1.5 | 1.5 | 1.5 | 1.5 | 1.5 |
| Potassium phosphate II | | | | | | | |
| Malonic acid | | 0.5 | 0.5 | 0.5 | 0.5 | 0.5 | 0.5 |
| Magnesium nitrate | 0.02 | | 0.02 | 0.02 | 0.02 | 0.02 | 0.02 |
| Mercaptobenzothiazole soda | 0.4 | 0.4 | | 0.4 | 0.4 | 0.4 | 0.4 |
| Sodium nitrate | 0.4 | 0.4 | 0.4 | | 0.4 | 0.4 | 0.4 |
| Sodium benzoate | 4.0 | 4.0 | 4.0 | 4.0 | | 4.0 | 4.0 |
| Copolymer (1) | 0.05 | 0.05 | 0.05 | 0.05 | 0.05 | | 0.05 |
| Copolymer (2) | | | | | | | |
| Copolymer (3) | | | | | | | |
| Potassium hydroxide | 1.0 | 1.8 | 1.8 | 1.8 | 1.8 | 1.8 | |
| Sodium hydroxide | | | | | | | |
| Test for metal corrosion (mg/cm$^2$) | | | | | | | |
| Cast aluminum | −0.44 | −1.58 | −1.02 | −0.58 | −0.42 | −1.46 | −0.47 |
| Cast iron | −0.22 | −1.58 | −0.78 | −1.46 | −1.56 | −0.49 | −0.53 |
| Steel | −0.10 | −0.35 | −0.38 | −0.13 | −0.22 | −0.22 | −0.35 |
| Brass | −0.11 | −0.16 | −0.38 | −0.06 | −0.12 | −0.13 | −0.06 |
| Solder | −0.15 | −0.22 | −0.30 | −0.14 | −0.36 | −0.43 | −0.20 |
| Copper | −0.06 | −0.18 | −0.42 | −0.07 | −0.10 | −0.11 | −0.09 |
| Appearance | Note 5 | Note 1 | Note 1* | Note 1 | Note 2 | Note 2 | Note 7 |
| Test for corrosion of heat Transferring surface | | | | | | | |
| Change in mass of test piece (mg/cm$^3$) | −0.54 | −1.01 | −1.92 | −1.21 | −0.61 | −0.98 | −0.48 |
| pH before test | 7.8 | 7.8 | 8.2 | 7.9 | 7.7 | 7.7 | 6.3 |
| pH after test | 9.1 | 9.2 | 8.9 | 8.5 | 8.1 | 9.0 | 7.5 |
| Appearance of liquid after test | cl | cl | cl | cl | not changed | cl | not changed |
| Appearance of test piece after test | bk | bk | bk | bk | bw | bk | bw |

Note 1: cast aluminum and cast iron corrosion
Note 2: cast aluminum, cast iron and solder corrosion
Note 5: squeezeout corrosion of cast aluminum
Note 7: cast iron and steel corrosion
*: copper changed color
cl: cloudy
bk: black
bw: brown

TABLE 18

| Composition of antifreeze (% by weight) | Example | | | | | | |
|---|---|---|---|---|---|---|---|
| | 104 | 105 | 106 | 107 | 108 | 109 | 110 |
| Monoethylene glycol | 95 | 95 | 95 | 95 | 95 | 95 | 95 |

TABLE 18-continued

| | | | | | | | |
|---|---|---|---|---|---|---|---|
| Water | 5 | 5 | 5 | 5 | 5 | 5 | 5 |
| Phosphoric acid (85% by weight) | 1.5 | | 1.5 | 1.5 | 1.5 | 1.5 | 1.5 |
| Potassium phosphate II | | 2.0 | | | | | |
| Phthalic acid | 0.3 | | 0.3 | 0.3 | 0.3 | 0.3 | 0.3 |
| Isophthalic acid | | 0.3 | | | | | |
| Magnesium nitrate | 0.02 | 0.02 | 0.02 | 0.02 | 0.005 | 0.05 | 0.02 |
| Mercaptobenzothiazole soda | 0.4 | 0.4 | 0.4 | 0.4 | 0.4 | 0.4 | 0.4 |
| Sodium nitrate | 0.4 | 0.4 | 0.4 | 0.4 | 0.4 | 0.4 | 0.4 |
| Sodium benzoate | 4.0 | 4.0 | 4.0 | 4.0 | 4.0 | 4.0 | 4.0 |
| Copolymer (1) | 0.05 | 0.05 | | | 0.05 | 0.05 | 0.05 |
| Copolymer (2) | | | 0.05 | | | | |
| Copolymer (3) | | | | 0.05 | | | |
| Potassium hydroxide | 1.8 | 0.8 | 1.8 | 1.8 | 1.8 | 1.8 | |
| Sodium hydroxide | | | | | | | 1.0 |
| Test for metal corrosion (mg/cm$^2$) | | | | | | | |
| Cast aluminum | −0.09 | −0.06 | −0.00 | −0.07 | −0.01 | −0.09 | −0.06 |
| Cast iron | −0.00 | −0.04 | −0.00 | −0.06 | −0.06 | −0.08 | −0.01 |
| Steel | −0.08 | −0.06 | −0.03 | −0.02 | −0.05 | −0.03 | −0.02 |
| Brass | −0.09 | −0.07 | −0.08 | −0.05 | −0.05 | −0.06 | −0.05 |
| Solder | −0.06 | −0.06 | −0.04 | −0.09 | −0.07 | −0.04 | −0.02 |
| Copper | −0.04 | −0.06 | −0.07 | −0.07 | −0.02 | −0.01 | −0.08 |
| Appearance | no corrosion | no corrosion | no corrosion | no corrosion | no corrosion | no corrosion | no corrosion |
| Test for corrosion of heat Transferring surface | | | | | | | |
| Change in mass of test piece (mg/cm$^3$) | −0.02 | −0.02 | −0.01 | −0.08 | −0.01 | −0.05 | −0.04 |
| pH before test | 7.8 | 7.8 | 7.8 | 7.8 | 7.8 | 7.8 | 7.8 |
| pH after test | 7.9 | 7.8 | 7.7 | 7.8 | 7.7 | 7.9 | 7.8 |
| Appearance of liquid after test | not changed | not changed | not changed | not changed | not changed | not changed | not changed |
| Appearance of test piece after test | not changed | not changed | not changed | not changed | not changed | not changed | not changed |

| Composition of antifreeze (% by weight) | Control | | | | |
|---|---|---|---|---|---|
| | 97 | 98 | 99 | 100 | 101 |
| Monoethylene glycol | 95 | 95 | 95 | 95 | 95 |
| Water | 5 | 5 | 5 | 5 | 5 |
| Phosphoric acid (85% by weight) | 1.5 | | 1.5 | 1.5 | 1.5 |
| Potassium phosphate II | | | | | |
| Phthalic acid | | 0.3 | 0.3 | 0.3 | 0.3 |
| Isophthalic acid | | | | | |
| Magnesium nitrate | 0.02 | | 0.02 | 0.02 | 0.02 |
| Mercaptobenzothiazole soda | 0.4 | 0.4 | | 0.4 | 0.4 |
| Sodium nitrate | 0.4 | 0.4 | | 0.4 | 0.4 |
| Sodium benzoate | 4.0 | 4.0 | | 4.0 | 4.0 |
| Copolymer (1) | 0.05 | 0.05 | 0.05 | | 0.05 |
| Copolymer (2) | | | | | |
| Copolymer (3) | | | | | |
| Potassium hydroxide | 1.0 | 1.8 | 1.8 | 1.8 | |
| Sodium hydroxide | | | | | |
| Test for metal corrosion (mg/cm$^2$) | | | | | |
| Cast aluminum | −0.34 | −1.86 | −1.75 | −0.68 | −0.42 |
| Cast iron | −0.19 | −0.79 | −1.18 | −0.96 | −0.56 |
| Steel | −0.10 | −0.28 | −0.42 | −0.23 | −0.33 |
| Brass | −0.09 | −0.16 | −0.38 | −0.08 | −0.10 |
| Solder | −0.13 | −0.26 | −0.45 | −0.34 | −0.21 |
| Copper | −0.06 | −0.14 | −0.36 | −0.10 | −0.05 |
| Appearance | Note 5 | Note 1 | Note 2* | Note 1 | Note 7 |
| Test for corrosion of heat Transferring surface | | | | | |
| Change in mass of test piece (mg/cm$^3$) | −1.42 | −2.98 | −0.92 | −0.81 | −0.51 |
| pH before test | 7.9 | 7.7 | 7.6 | 7.9 | 6.2 |
| pH after test | 9.0 | 9.3 | 7.9 | 8.2 | 7.6 |
| Appearance of liquid after test | cl | cl | cl | cl | not changed |
| Appearance of test piece after test | bk | bk | bw | bk | bw |

Note 1: cast aluminum and cast iron corrosion
Note 2: cast aluminum, cast iron and solder corrosion
Note 5: squeezeout corrosion of cast aluminum
Note 7: cast iron and steel corrosion
*: copper changed color
cl: cloudy
bk: black
bw: brown

EXAMPLES 111 to 117

Varying components indicated in Table 19 were dissolved in varying proportions indicated in Table 19 in 5 parts by weight of tap water or 95 parts by weight of monoethylene glycol and the two liquids were mixed.

The varying samples thus obtained were subjected to the following test and relevant measurement.

Test for metal corrosion

The results were as shown in Table 19.

CONTROLS 102 to 105

Varying components indicated in Table 19 were dissolved in varying proportions indicated in Table 19 in 5 parts by weight of tap water or 95 parts by weight of monoethylene glycol and the two liquids were mixed.

The varying samples thus obtained were subjected to the following test and relevant measurement.

Test for metal corrosion

The results were as shown in Table 19.

TABLE 19

| Composition of antifreeze | Example | | | | | | |
|---|---|---|---|---|---|---|---|
| (% by weight) | 111 | 112 | 113 | 114 | 115 | 116 | 117 |
| Monoethylene glycol | 95 | 95 | 95 | 95 | 95 | 95 | 95 |
| Water | 5 | 5 | 5 | 5 | 5 | 5 | 5 |
| Phosphoric acid (85% by weight) | 1.5 | | 1.5 | 1.5 | 1.5 | 1.5 | 1.5 |
| Potassium phosphate II | | 2.0 | | | | | |
| Magnesium nitrate | 0.02 | 0.02 | 0.02 | 0.02 | 0.005 | 0.05 | 0.02 |
| Mercaptobenzothiazole soda | 0.4 | 0.4 | 0.4 | 0.4 | 0.4 | 0.4 | 0.4 |
| Sodium nitrate | 0.4 | 0.4 | 0.4 | 0.4 | 0.4 | 0.4 | 0.4 |
| Sodium benzoate | 4.0 | 4.0 | 4.0 | 4.0 | 4.0 | 4.0 | 4.0 |
| Copolymer (1) | 0.05 | 0.05 | | | 0.05 | 0.05 | 0.05 |
| Copolymer (2) | | | 0.05 | | | | |
| Copolymer (3) | | | | 0.05 | | | |
| Potassium hydroxide | 1.0 | 0.4 | 1.0 | 1.0 | 1.0 | 1.0 | |
| Sodium hydroxide | | | | | | | 0.5 |
| Test for metal corrosion (mg/cm$^2$) | | | | | | | |
| Cast aluminum | −0.06 | −0.03 | −0.00 | −0.03 | −0.02 | −0.07 | −0.04 |
| Cast aluminum | −0.00 | −0.02 | −0.07 | −0.03 | −0.01 | −0.05 | −0.06 |
| Steel | −0.04 | −0.02 | −0.05 | −0.04 | −0.05 | −0.02 | −0.01 |
| Brass | −0.07 | −0.04 | −0.05 | −0.04 | −0.05 | −0.06 | −0.05 |
| Solder | −0.07 | −0.10 | −0.08 | −0.10 | −0.02 | −0.10 | −0.03 |
| Copper | −0.04 | −0.02 | −0.03 | −0.03 | −0.06 | −0.02 | −0.03 |
| Appearance of test piece | no corrosion | no corrosion | no corrosion | no corrosion | no corrosion | no corrosion | no corrosion |

| Composition of antifreeze | Control | | | |
|---|---|---|---|---|
| (% by weight) | 102 | 103 | 104 | 105 |
| Monoethylene glycol | 95 | 95 | 95 | 95 |
| Water | 5 | 5 | 5 | 5 |
| Phosphoric acid (85% by weight) | 1.5 | 1.5 | 1.5 | 1.5 |
| Potassium phosphate II | | | | |
| Magnesium nitrate | | 0.02 | 0.02 | 0.02 |
| Mercaptobenzothiazole soda | 0.4 | | 0.4 | 0.4 |
| Sodium nitrate | 0.4 | | 0.4 | 0.4 |
| Sodium benzoate | 4.0 | | 4.0 | 4.0 |
| Copolymer (1) | 0.05 | 0.05 | | |
| Copolymer (2) | | | | |
| Copolymer (3) | | | | |
| Potassium hydroxide | 1.0 | 1.0 | 1.0 | |
| Sodium hydroxide | | | | |
| Test for metal corrosion (mg/cm$^2$) | | | | |
| Cast aluminum | −1.28 | −1.02 | −0.68 | −0.32 |
| Cast aluminum | −0.12 | −1.40 | −1.21 | −0.61 |
| Steel | −0.52 | −0.56 | −0.26 | −0.23 |
| Brass | −0.09 | −0.19 | −0.10 | −0.08 |
| Solder | −0.22 | −0.42 | −0.27 | −0.21 |
| Copper | −0.11 | −0.34 | −0.10 | −0.10 |
| Appearance of test piece | corrosion | corrosion | corrosion | corrosion |

What is claimed is:

1. Antifreeze composition consisting of a glycol, water, and inhibitor wherein said inhibitor consists of, in % part by weight, based on the amount of the glycol
   (A) 0.1 to 5% by weight of a phosphoric acid compound,
   (B) a compound of at least one metal selected from the group consisting of 0.0001 to 0.05% by weight of manganese and 0.001 to 0.08% by weight of magnesium,
   (C) 0.05% to 5% by weight of at lest one corrosion proofing agent selected from the group consisting of sulfites, nitrates, vanadic acid, vanadates, sodium benzoate, sodium p-tertiary butylbenzoate, sodium mercaptobenzothiazole, methylbenzotriazole and benzotriazole, and
   (D) at least one compound selected from the group consisting of
      (a) 0.05 to 1% by weight of an aromatic polybasic acid or salt thereof,
      (b) 0.05 to 1% by weight of an aliphatic dicarboxylic acid or a slat thereof,
      (c) 0.1 to 1% by weight of a molybdate,
      (d) 0.01 to 0.1% by weight of a copolymer derived from a member selected from the group consisting of
         (i) an alkylene glycol monoallyl ether (I) represented by the formula l:

$$CH_2=CH-CH_2O(C_2H_4O)_m(C_3H_6O)_nH \qquad (I)$$

wherein m and n are independently 0 or a positive integer, providing that the sum of m and n falls in the range of 1 to 100 and the ($C_2H_4O$) units and the ($C_3H_6O$) units may be bound in any order (ii) a maleic acid type monomer (II) represented by the formula ll:

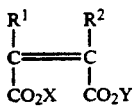

(II)

wherein $R^1$ and $R^2$ are independently a hydrogen atom or methyl group, and X and Y are independently:

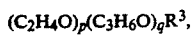

wherein $R^3$ is an alkyl of 1 to 20 atoms and p and q are independently 0 or a positive integer, providing that the sum of p and q falls in the range of 0 to 100 and the $(C_2H_4O)$ units and the $(C_3H_6O)$ units may be bound in any order: a monovalent metal: a divalent metal; an ammonium group: or an organic amine group: with (iii) at least one member, copolymerizable with (i) or (ii), selected from the group consisting of acrylic acid, methacrylic acid, itaconic acid, crotonic acid, monovalent metal salts, divalent metal salts, ammonium salts and organic salts of the acid mentioned above, esters derived from these acids with alcohols, (meth)acrylamide, vinyl acetate, propenyl acetate, styrene, p-methylstyrene, and other aromatic vinyl compounds and vinyl chloride, having a pH value in the range of 6.5 to 9.

2. A composition according to claim 1, wherein the gravimetric ratio of said glycol to water is in the range of 99 : 1 to 5 : 95.

3. A composition according to claim 1, wherein the compound of (D) is an aromatic polybasic acid.

4. A composition according to claim 1, wherein the compound of (D) is an aliphatic dicarboxylic acid.

5. A composition according to claim 1, wherein the compound of (D) is a molybdate.

6. A composition according to claim 1 wherein the compound of (D) is a copolymer of at least one monomer selected from the group consisting of (i) an alkylene glycol monoallyl ether (l) and (ii) a maleic acid type monomer (ll) with (iii) at least one member, copolymerizable with (i) or (ii), selected from the group consisting of acrylic acid, methacrylic acid, itaconic acid, crotonic acid, monovalent metal salts, divalent metal salts, ammonium salts and organic slats of the acids mentioned above, esters derived from these acids with alcohols, acrylamide, vinyl acetate, propenyl acetate, styrene, p-methylstyrene, and other aromatic vinyl compounds and vinyl chloride.

7. A composition according to claim 6, wherein said corrosionproofing agent is at least one compound selected from the group consisting of sodium mercaptobenzothiazole, methyl benzotriazole, sodium nitrate, and sodium benzoate.

8. A composition according to claim 1, wherein said phosphoric acid compound is phosphoric acid or potassium phosphate.

9. A composition according to claim 1, wherein said compound of manganese is manganese nitrate or manganese sulfate.

10. A composition according to claim 1, wherein said compound of magnesium is magnesium nitrate.

11. A composition according to claim 3, wherein said aromatic polybasic acid is phthalic acid or isophthalic acid.

12. A composition according to claim 4, wherein said aliphatic dicarboxylic acid is malonic acid.

13. A composition according to claim 5, wherein said molybdate is sodium molybdate.

14. A composition according to claim 6, wherein said copolymer is derived from said (i) alkylene glycol monoallyl ether (l), said (ii) maleic acid type monomer (ll) and said (iii) at least one member selected from the group consisting of acrylic acid, methacrylic acid, itaconic acid, crotonic acid, monovalent metal salts, divalent metal salts, ammonium salts and organic salts of the acids mentioned above, esters derived from these acids with alcohols, (meth)acrylamide, vinyl acetate, propenyl acetate, styrene, p-methylstyrene, and other aromatic vinyl compounds and vinyl chloride, in respective portions of 24 to 75 mol%, 24 to 75 mol%, and 0 to 50 mol%, providing that the total of the components (i), (ii), (iii), is 100 mol%.

* * * * *